US011064044B2

(12) United States Patent
Liensberger et al.

(10) Patent No.: US 11,064,044 B2
(45) Date of Patent: Jul. 13, 2021

(54) INTENT-BASED SCHEDULING VIA DIGITAL PERSONAL ASSISTANT

(71) Applicant: Microsoft Technology Licensing, LLC, Redmond, WA (US)

(72) Inventors: Christian Liensberger, Seattle, WA (US); Marcus A. Ash, Renton, WA (US); Nikrouz Ghotbi, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 708 days.

(21) Appl. No.: 15/263,609

(22) Filed: Sep. 13, 2016

(65) Prior Publication Data

US 2017/0286853 A1 Oct. 5, 2017

Related U.S. Application Data

(60) Provisional application No. 62/314,966, filed on Mar. 29, 2016.

(51) Int. Cl.
| | |
|---|---|
| *H04L 29/08* | (2006.01) |
| *H04W 4/029* | (2018.01) |
| *G06Q 10/10* | (2012.01) |
| *G06Q 10/06* | (2012.01) |
| *G06F 3/0481* | (2013.01) |
| *G06F 3/0484* | (2013.01) |

(Continued)

(52) U.S. Cl.
CPC .......... *H04L 67/32* (2013.01); *G06F 3/0481* (2013.01); *G06F 3/0484* (2013.01); *G06N 5/048* (2013.01); *G06Q 10/06* (2013.01);

*G06Q 10/063* (2013.01); *G06Q 10/06311* (2013.01); *G06Q 10/10* (2013.01); *H04L 67/02* (2013.01); *H04L 67/22* (2013.01); *H04L 67/34* (2013.01); *H04W 4/029* (2018.02); *H04W 4/14* (2013.01)

(58) Field of Classification Search
CPC ......... G06Q 10/06312; G06Q 10/1093; G06Q 10/025; G06F 3/0484; G06F 3/0481
See application file for complete search history.

(56) References Cited

U.S. PATENT DOCUMENTS

| | | | |
|---|---|---|---|
| 6,553,358 B1 | 4/2003 | Horvitz | |
| 7,343,312 B2 * | 3/2008 | Capek | ................. G06Q 10/109 705/7.19 |
| 7,584,253 B2 | 9/2009 | Curbow et al. | |

(Continued)

OTHER PUBLICATIONS

Mitchell, et al., "Experience With a Learning Personal Assistant", In Magazine of Communications of the ACM, vol. 37, Issue 7, Jul. 1994, pp. 1-18.

(Continued)

*Primary Examiner* — Ann J Lo
*Assistant Examiner* — Van C Mang
(74) *Attorney, Agent, or Firm* — Wade IP Law PLLC

(57) ABSTRACT

Techniques are described herein that are capable of performing intent-based scheduling via a digital personal assistant. For instance, an intent of user(s) to perform an action (a.k.a. activity) may be used to schedule time (e.g., on a calendar of at least one of the user(s)) in which the action is to be performed. Examples of performing an action include but are not limited to having a meeting, working on a project, participating in a social event, exercising, and reading.

23 Claims, 12 Drawing Sheets

(51) Int. Cl.
*G06N 5/04* (2006.01)
*H04W 4/14* (2009.01)

(56) References Cited

U.S. PATENT DOCUMENTS

| | | | |
|---|---|---|---|
| 7,693,736 B1* | 4/2010 | Chu | G06Q 10/1095 705/7.19 |
| 7,703,048 B2 | 4/2010 | Alford et al. | |
| 7,707,256 B2 | 4/2010 | Rollin et al. | |
| 8,000,453 B2 | 8/2011 | Cooper et al. | |
| 8,346,590 B2* | 1/2013 | Norton | G06Q 10/109 705/7.18 |
| 8,375,034 B2 | 2/2013 | Norton et al. | |
| 8,483,375 B2 | 7/2013 | Dhara et al. | |
| 8,495,211 B2 | 7/2013 | Kuno et al. | |
| 8,504,404 B2 | 8/2013 | Norton | |
| 8,719,335 B2 | 5/2014 | Venkatesh et al. | |
| 8,743,171 B2 | 6/2014 | Hiller et al. | |
| 8,965,922 B2 | 2/2015 | Kandogan et al. | |
| 9,195,972 B2 | 11/2015 | Gopinath et al. | |
| 9,374,327 B2 | 6/2016 | Rao Dv | |
| 10,007,886 B1 | 6/2018 | Khvostichenko | |
| 10,007,897 B2 | 6/2018 | Possing et al. | |
| 10,163,074 B2 | 12/2018 | Wilkerson et al. | |
| 2002/0069191 A1 | 6/2002 | Ellis et al. | |
| 2003/0004776 A1 | 1/2003 | Perrella et al. | |
| 2003/0167167 A1 | 9/2003 | Gong | |
| 2003/0217073 A1 | 11/2003 | Walther et al. | |
| 2004/0128304 A1 | 7/2004 | Rokosz | |
| 2006/0200374 A1* | 9/2006 | Nelken | G06Q 10/109 705/7.19 |
| 2006/0236269 A1 | 10/2006 | Borna | |
| 2008/0113655 A1 | 5/2008 | Angelhag | |
| 2008/0300944 A1 | 12/2008 | Surazski et al. | |
| 2009/0063270 A1 | 3/2009 | Bengtsson et al. | |
| 2009/0063993 A1 | 3/2009 | Nyamgondalu | |
| 2009/0077244 A1* | 3/2009 | Trang | H04M 3/42195 709/228 |
| 2009/0132329 A1* | 5/2009 | Lam | G06Q 10/109 705/7.13 |
| 2009/0187531 A1 | 7/2009 | Singh et al. | |
| 2009/0204612 A1 | 8/2009 | Keshavarz-Nia et al. | |
| 2009/0234690 A1 | 9/2009 | Nikipelo | |
| 2010/0070877 A1* | 3/2010 | Scott | G06Q 10/109 715/751 |
| 2010/0223089 A1 | 9/2010 | Godfrey et al. | |
| 2010/0280748 A1 | 11/2010 | Mundinger et al. | |
| 2011/0066468 A1 | 3/2011 | Huang et al. | |
| 2011/0076994 A1* | 3/2011 | Kim | G06Q 10/109 455/414.2 |
| 2012/0004942 A1* | 1/2012 | Callanan | G06Q 10/06312 705/7.22 |
| 2012/0030194 A1 | 2/2012 | Jain | |
| 2012/0271676 A1 | 10/2012 | Aravamudan et al. | |
| 2013/0085886 A1 | 4/2013 | Satish et al. | |
| 2013/0275875 A1 | 10/2013 | Gruber et al. | |
| 2013/0311997 A1 | 11/2013 | Gruber et al. | |
| 2014/0108085 A1 | 4/2014 | Henriksen et al. | |
| 2014/0114705 A1 | 4/2014 | Bashvitz et al. | |
| 2014/0115456 A1* | 4/2014 | White | G10L 15/22 715/708 |
| 2014/0185417 A1 | 7/2014 | Zhao | |
| 2014/0245140 A1 | 8/2014 | Brown et al. | |
| 2014/0257902 A1 | 9/2014 | Moore et al. | |
| 2014/0259178 A1 | 9/2014 | Karaa et al. | |
| 2014/0278405 A1* | 9/2014 | Peters | G06F 16/345 704/235 |
| 2014/0297758 A1 | 10/2014 | Kidron et al. | |
| 2014/0317502 A1 | 10/2014 | Brown et al. | |
| 2015/0006221 A1* | 1/2015 | Mermelstein | G06Q 10/1095 705/7.19 |
| 2015/0058425 A1* | 2/2015 | Nathan | H04L 65/4038 709/206 |
| 2015/0141063 A1 | 5/2015 | Lawless | |
| 2015/0169336 A1 | 6/2015 | Harper et al. | |
| 2015/0193819 A1 | 7/2015 | Chang | |
| 2015/0199649 A1 | 7/2015 | Weinberg et al. | |
| 2015/0229728 A1 | 8/2015 | Savolainen | |
| 2015/0293904 A1 | 10/2015 | Roberts | |
| 2015/0324753 A1 | 11/2015 | Dantuluri et al. | |
| 2015/0339679 A1 | 11/2015 | Lefor | |
| 2015/0358414 A1* | 12/2015 | Mehta | G06Q 10/109 705/5 |
| 2015/0382047 A1 | 12/2015 | Van os et al. | |
| 2016/0055215 A1* | 2/2016 | Kauwe | G06F 16/284 707/722 |
| 2017/0014068 A1 | 1/2017 | Gotoh et al. | |
| 2017/0236097 A1 | 8/2017 | Smith | |

OTHER PUBLICATIONS

"International Search Report and Written Opinion Issued in PCT Application No. PCT/US2017/023937", dated May 15, 2017, 12 Pages.

"Non Final Office Action Issued in U.S. Appl. No. 15/220,643", dated Mar. 6, 2019, 23 Pages.

"Being Digital: the post app era", http://www.openstream.com/media/openstream_virtual_assistants_position_paper, Oct. 2015, 8 pages.

"Final Office Action Issued in U.S. Appl. No. 15/220,643", dated Oct. 29, 2018, 23 pages.

"Non Final Office Action Issued in U.S. Appl. No. 15/220,643", dated Apr. 30, 2018, 21 pages.

"Non Final Office Action Issued in U.S. Appl. No. 15/263,685", dated Sep. 17, 2018, 15 pages.

Daniele, et al., "A SOA-Based Platform-Specific Framework for Context-Aware Mobile Applications", In Proceedings of Second International Workshop on Enterprise Interoperabilit, Oct. 13, 2009, 13 pages.

Dunlop, "Digital Personal Assistant for the Enterprise", In White Paper of Intel, Feb. 2013, pp. 1-8.

Gupta, Rakhi Misuriya., "MOBISPA: A Reference Framework for Mobile As A Secure Personal Assistant", In Journal of Computing Research Repository, Jul. 2015, 12 pages.

Kofod-Petersen, et al., "Case-Based Situation Assessment in a Mobile Context-Aware System", In Proceedings of Workshop on Artificial Intgelligence for Mobil Systems, Oct. 2003, 8 pages.

Myers, et al., "An Intelligent Personal Assistant for Task and Time Management", AI Magazine, vol. 28, Issue 2, Jun. 15, 2007, 19 pages.

"International Search Report and Written Opinion Issued in PCT Application No. PCT/US2017/023704", dated May 15, 2017, 11 pages.

"International Search Report and Written Opinion Issued in PCT Application No. PCT/US2017/023940", dated May 15, 2017, 11 pages.

Smalley, Eric, "Siri Points the Way to Analytics-Driven Enterprise Assistants", http://data-informed.com/siri-points-the-way-to-analytics-driven-enterprise-assistants/, May 1, 2013, 3 pages.

Wieland, et al., "Towards Context-aware Workflows", In Proceedings of the Workshops and Doctoral Consortium vol. 2, Jun. 2007, 15 pages.

"Final Office Action Issued in U.S. Appl. No. 15/220,643", dated Sep. 3, 2019, 23 Pages.

"Final Office Action Issued in U.S. Appl. No. 15/263,685", dated May 15, 2019, 18 Pages.

"Non Final Office Action Issued in U.S. Appl. No. 15/263,685", dated Jan. 9, 2020, 14 Pages.

"Final Office Action Issued in U.S. Appl. No. 15/263,685", dated Aug. 6, 2020, 18 Pages.

"Non Final Office Action Issued in U.S. Appl. No. 15/220,643", dated Mar. 2, 2020, 23 Pages.

"Final Office Action Issued in U.S. Appl. No. 15/220,643", dated Oct. 19, 2020, 30 Pages.

(56) References Cited

OTHER PUBLICATIONS

"Non Final Office Action Issued in U.S. Appl. No. 15/263,685", dated Feb. 16, 2021, 21 Pages.

* cited by examiner

INTENT-BASED SCHEDULING VIA DIGITAL PERSONAL ASSISTANT

CROSS-REFERENCE TO RELATED APPLICATION(S)

This application claims the benefit of U.S. Provisional Application No. 62/314,966, filed Mar. 29, 2016 and entitled "Extensibility for Context-Aware Digital Personal Assistant," the entirety of which is incorporated by reference herein.

BACKGROUND

It has become relatively common for devices, such as laptop computers, tablet computers, personal digital assistants (PDAs), and cell phones, to have digital personal assistant functionality. A digital personal assistant is a representation of an entity that interacts with a user of a device. For instance, the digital personal assistant may answer questions that are asked by the user or perform tasks based on instructions from the user. One example of a digital personal assistant is Siri®, which was initially developed by Siri, Inc. and has since been further developed and maintained by Apple Inc. Another example of a digital personal assistant is Cortana®, which is developed and maintained by Microsoft Corporation. Although a digital personal assistant typically is able to communicate with a user of a device, functionality of conventional digital personal assistants often is limited to reacting to specific requests from the user.

SUMMARY

Various approaches are described herein for, among other things, performing intent-based scheduling via a digital personal assistant. For instance, an intent of user(s) to perform an action (a.k.a. activity) may be used to schedule time (e.g., on a calendar of at least one of the user(s)) in which the action is to be performed. Examples of performing an action include but are not limited to having a meeting, working on a project, participating in a social event, exercising, and reading.

In a first example approach, communication(s) from a first user are analyzed (e.g., programmatically analyzed or processed) to identify a first communication from the first user that indicates that the first user has an intent to have a first meeting between at least the first user and second user(s). Communication(s) from the second user(s) are analyzed to identify second communication(s) from the second user(s) that are in response to the first communication and that indicate that the second user(s) have the intent to have the first meeting. A digital personal assistant is caused (e.g., programmatically configured) to automatically propose and/or automatically schedule a time to have the first meeting between at least the first user and the second user(s) based at least in part on the first communication and the second communication(s) indicating that the first user and the second user(s) have the intent to have the first meeting.

In a second example approach, interactions among users are identified. Tools that are used to facilitate the interactions are identified. An intent to have a meeting between the users is inferred. A designated tool is automatically selected to establish communication for the meeting based at least in part on the designated tool being used more than other tools to facilitate the interactions. A digital personal assistant is caused to automatically schedule the meeting and/or automatically propose to schedule the meeting based at least in part on an inference of the intent to have the meeting.

In a third example approach, communication(s) from a first user are analyzed to infer from at least a first communication that the first user has an intent to perform an activity. A digital personal assistant is caused to automatically schedule a designated time on a visual representation of a calendar of the first user to perform the activity, including causing the digital personal assistant to automatically update the visual representation of the calendar to include a visual representation of the activity that is configured to indicate that the designated time is scheduled to perform the activity, based at least in part on an inference from at least the first communication that the first user has the intent to perform the activity.

In a fourth example approach, instances of an action that are performed by a user at respective historical time instances are analyzed to identify a trend with regard to the instances of the action. A digital personal assistant is caused to automatically schedule a designated time for the user to perform a future instance of the action in accordance with the trend, including causing the digital personal assistant to configure a visual representation of a calendar of the user to indicate that availability of the user at the designated time is tentative or booked.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIG. 1 is a block diagram of an example intent-based scheduling system in accordance with an embodiment.

FIGS. 2, 6-7, 9, and 11 depict flowcharts of example methods for performing intent-based scheduling via a digital personal assistant in accordance with embodiments.

FIGS. 3, 8, 10, and 12 are block diagrams of example computing systems in accordance with embodiments.

Figure 1:
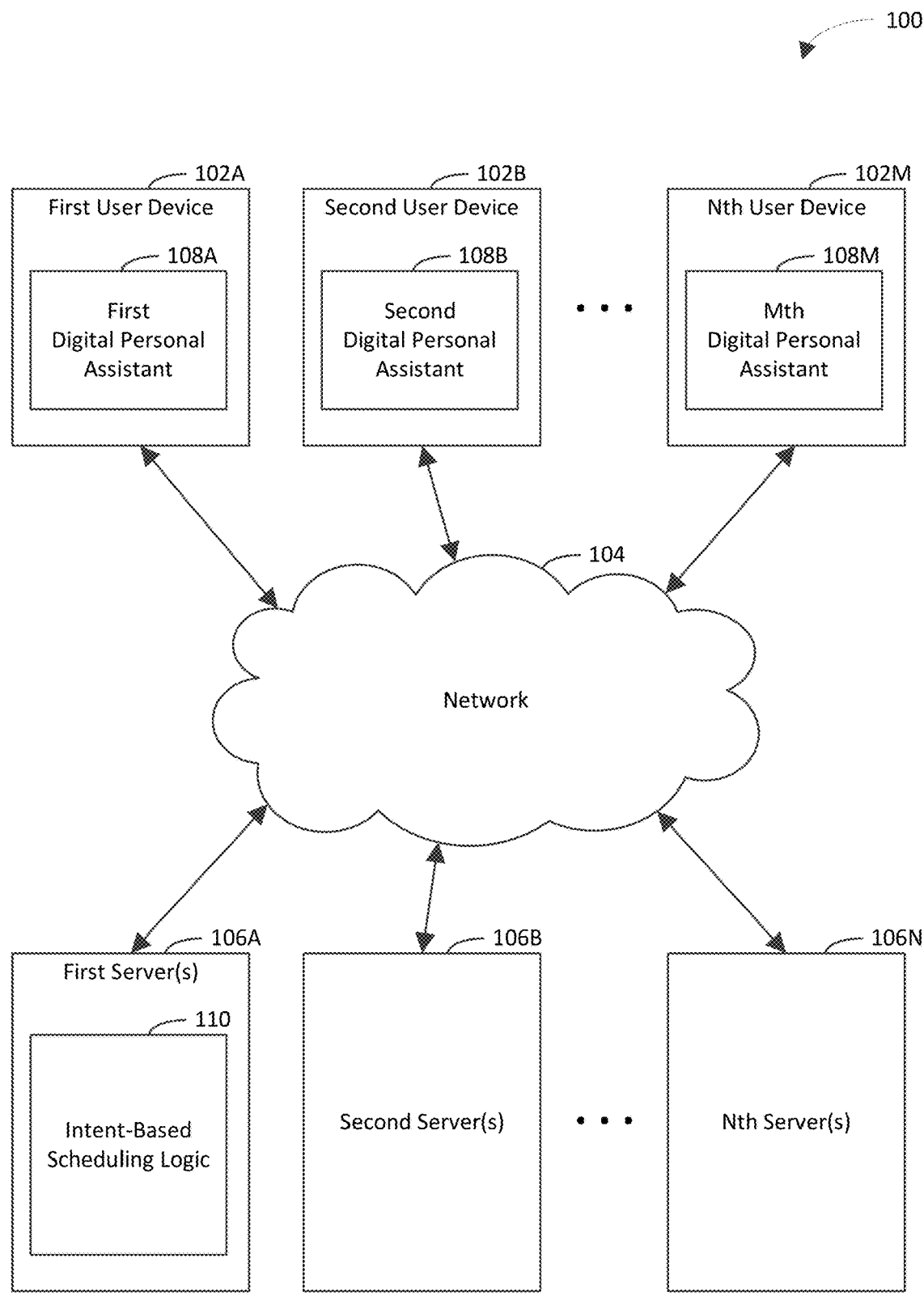

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of performing intent-based scheduling via a digital personal assistant. For instance, an intent of user(s) to perform an action (a.k.a. activity) may be used to propose and/or schedule time (e.g., on a calendar of at least one of the user(s)) in which the action is to be performed. Examples of performing an action include but are not limited to having a meeting, working on a project, participating in a social event, exercising, and reading.

Example techniques described herein have a variety of benefits as compared to conventional techniques for managing a schedule of a user. For instance, the example techniques may be capable of automatically proposing and/or scheduling time in which to perform an activity based at least in part on inferred intent of the user and/or other user(s), automatically updating a calendar to reflect an appointment or meeting for performance of the activity, automatically managing conflicts with regard to the appointment or meeting (e.g., based on inferred relative importance of the conflicting activities), and automatically inferring attribute(s) of the appointment or meeting. Examples of an attribute include but are not limited to a location at which the appointment or meeting is to occur, a communication channel to be used for the appointment or meeting, documentation to be used in preparation for and/or during the appointment or meeting, and people to be notified about and/or invited to the appointment or meeting.

The example techniques may simplify a process for managing a schedule of a user. The example techniques may reduce an amount of time and/or resources (e.g., processor, memory, network bandwidth) that are consumed to manage the schedule of the user. The example embodiments may increase efficiency of a computing device that is used to manage the schedule of the user. The example techniques may increase user efficiency (e.g., by reducing a number of steps that a user takes to manage the schedule of the user). For instance, the example techniques described herein may reduce (e.g., eliminate) a need for a user to manually add an appointment or meeting to a calendar and/or to manage conflicts (e.g., temporal conflicts) associated with such appointment or meeting.

FIG. 1 is a block diagram of an example intent-based scheduling system 100 in accordance with an embodiment. Generally speaking, intent-based scheduling system 100 operates to provide information to users in response to requests (e.g., hypertext transfer protocol (HTTP) requests) that are received from the users. The information may include documents (e.g., Web pages, images, audio files, video files, etc.), output of executables, and/or any other suitable type of information. In accordance with example embodiments described herein, intent-based scheduling system 100 performs intent-based scheduling via a digital personal assistant. For instance, a user may dread creating and scheduling activities (e.g., meetings), updating a calendar to reflect such activities and the availability of the user, gathering information that is needed for the activities, and so on. The user may desire to delegate such tasks to a digital personal assistant. Intent-based scheduling logic 110 may infer (e.g., compute) an intent of the user to perform such tasks and cause (e.g., programmatically configure) the digital personal assistant to automatically perform the tasks on behalf of the user and/or to automatically provide recommendations to the user regarding the same (e.g., a recommended time, location, communication channel, documentation, attendees, and so on). Intent-based scheduling logic 110 may cause the digital personal assistant to enable the user to create an instruction to perform the task(s) automatically when the same intent is inferred in the future.

Intent of a user may be inferred based on any of a variety of factors, including but not limited to content of communication(s) among users, a behavioral trend of the user (e.g., a trend of activities performed by the user), and a location of the user. Examples of a communication include but are not limited to a telephone call, an in-person conversation, a conversation via a software application (e.g., Skype®, developed and distributed originally by Skype Technologies S.A.R.L. and subsequently by Microsoft Corporation; Whatsapp® Messenger, developed and distributed by WhatsApp Inc.; and Facebook® Messenger, developed and distributed by Facebook, Inc.), a voice mail, an email, a text message, a short message service (SMS) message, and a social update.

Detail regarding techniques for performing intent-based scheduling via a digital personal assistant is provided in the following discussion.

As shown in FIG. 1, intent-based scheduling system 100 includes a plurality of user devices 102A-102M, a network 104, and a plurality of servers 106A-106N. Communication among user devices 102A-102M and servers 106A-106N is carried out over network 104 using well-known network communication protocols. Network 104 may be a wide-area network (e.g., the Internet), a local area network (LAN), another type of network, or a combination thereof.

User devices 102A-102M are processing systems that are capable of communicating with servers 106A-106N. An example of a processing system is a system that includes at least one processor that is capable of manipulating data in accordance with a set of instructions. For instance, a processing system may be a computer, a personal digital assistant, etc. User devices 102A-102M are configured to provide requests to servers 106A-106N for requesting information stored on (or otherwise accessible via) servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, user devices 102A-102M are capable of accessing domains (e.g., Web sites) hosted by servers 106A-106N, so that user devices 102A-102M may access information that is available via the domains. Such domain may include Web pages, which may be provided as hypertext markup language (HTML) documents and objects (e.g., files) that are linked therein, for example.

Each of user devices 102A-102M may include any client-enabled system or device, including but not limited to a desktop computer, a laptop computer, a tablet computer, a wearable computer such as a smart watch or a head-mounted computer, a personal digital assistant, a cellular telephone, or the like. It will be recognized that any one or more user systems 102A-102M may communicate with any one or more servers 106A-106N.

User devices 102A-102M are shown to include respective digital personal assistants 108A-108M. Digital personal assistants 108A-108M are representations of respective entities that interact with users of user devices 102A-102M. Each of the digital personal assistants 108A-108M may be configured (e.g., controlled) to perform task(s) on behalf of the user(s) of the respective user device and/or to propose performance of the task(s) when an intent to perform the task(s) is inferred. For example, first digital personal assistant 108A may be configured to automatically propose and/or automatically schedule a time to perform a first activity in response to an intent of user(s) of first user device 102A to perform the first activity being inferred (e.g., from communication(s) of the user(s) of first user device 102A). Second digital personal assistant 108B may be configured to automatically propose and/or automatically schedule a time to perform a second activity, which may be same as or different from the first activity, in response to an intent of user(s) of second user device 102B to perform the second activity being inferred (e.g., from communication(s) of the user(s) of second user device 102A), and so on.

Servers 106A-106N are processing systems that are capable of communicating with user devices 102A-102M. Servers 106A-106N are configured to execute computer programs that provide information to users in response to receiving requests from the users. For example, the information may include documents (e.g., Web pages, images, audio files, video files, etc.), output of executables, or any other suitable type of information. In accordance with some example embodiments, servers 106A-106N are configured to host respective Web sites, so that the Web sites are accessible to users of intent-based scheduling system 100.

First server(s) 106A is shown to include intent-based scheduling logic 110 for illustrative purposes. Intent-based scheduling logic 110 is configured to implement digital personal assistants 108A-108M. For example, intent-based scheduling logic 110 may implement any one or more of digital personal assistants 108A-108M to manage scheduling for users.

Some example functionality of intent-based scheduling logic 110 will now be described with reference to first digital personal assistant 108A for purposes of illustration and is not intended to be limiting. It will be recognized that the functionality of intent-based scheduling logic 110 described herein is applicable to any suitable digital personal assistant (e.g., any one or more of digital personal assistants 108A-108M).

In a first example approach, intent-based scheduling logic 110 analyzes (e.g., programmatically analyzes or processes) communication(s) from a first user to identify a first communication from the first user that indicates that the first user has an intent to have a first meeting between at least the first user and second user(s). In one illustration of this approach, the first user may say, "Let's meet tomorrow to review this deck." In accordance with this illustration, the first user's statement indicates that the first user has an intent to have a meeting with one or more second users tomorrow.

In accordance with this approach, intent-based scheduling logic 110 analyzes communication(s) from the second user(s) to identify second communication(s) from the second user(s) that are in response to the first communication and that indicate that the second user(s) have the intent to have the first meeting. In the aforementioned illustration of this approach, a designated second user may say, "Sure, let's meet." In accordance with this illustration, the designated second user's statement constitutes a response to the first user's statement and indicates that the designated second user has the intent to have the meeting.

In further accordance with this approach, intent-based scheduling logic 110 causes (e.g., programmatically configures) a digital personal assistant to automatically propose and/or automatically schedule a time to have the first meeting between at least the first user and the second user(s) based at least in part on the first communication and the second communication(s) indicating that the first user and the second user(s) have the intent to have the first meeting. In the aforementioned illustration of this approach, assume that first user device 102A belongs to or is otherwise accessible to the first user, and the Mth user device 102M belongs to or is otherwise accessible to the second user. In accordance with this illustration, intent-based scheduling logic 110 may cause at least first digital personal assistant 108A and/or Mth digital personal assistant to automatically propose and/or schedule a time to have the meeting between at least the first user and the designated second user. It should be mentioned that intent-based scheduling logic 110 may cause any one or more of digital personal assistants 108A-108M that are associated with the second user(s) to automatically propose and/or schedule the time to have the meeting between the first user and any one or more of the second user(s) (e.g., based at least in part on the first user's statement and the designated second user's statement indicating the intent to have the meeting).

In a second example approach, intent-based scheduling logic 110 identifies interactions among users (e.g., users of any one or more of user devices 102A-102M). In one illustration of this approach, first user may have an in-person conversation with a second user, and the second user subsequently may have a telephone conference call with third and fourth users. In accordance with this illustration, intent-based scheduling logic 110 may identify the in-person conversation between the first and second users and the telephone conference call between the second, third, and fourth users.

In accordance with this approach, intent-based scheduling logic 110 identifies tools that are used to facilitate the interactions. In the aforementioned illustration of this approach, intent-based scheduling logic 110 may identify the in-person engagement and the telephone network as the tools that are used to facilitate the in-person conversation and the telephone conference call, respectively.

In further accordance with this approach, intent-based scheduling logic 110 infers an intent to have a meeting between the users. In the aforementioned illustration of this approach, intent-based scheduling logic 110 may infer that at least one of the first, second, third, and fourth users has an intent to have a meeting among the first, second, third, and fourth users. For instance, the intent may be inferred from statement(s) made during the in-person conversation and/or the telephone conference call and/or a different conversation by one or more of the first, second, third, and fourth users.

In further accordance with this approach, intent-based scheduling logic 110 automatically selects a designated tool to establish communication for the meeting based at least in part on the designated tool being used more than other tools to facilitate the interactions. In the aforementioned illustration of this approach, intent-based scheduling logic 110 may automatically select in-person engagement as the tool to establish communication for the meeting based on the first, second, third, and fourth users most often meeting in-person to discuss issues.

In further accordance with this approach, intent-based scheduling logic 110 causes a digital personal assistant to automatically schedule the meeting and/or automatically propose to schedule the meeting based at least in part on an inference of the intent to have the meeting. In the aforementioned illustration of this approach, intent-based scheduling logic 110 may cause any of digital personal assistants 108A-108M that are associated with the first, second, third, and/or fourth users to automatically schedule the meeting and/or automatically propose to schedule the meeting to be in-person, though intent-based scheduling logic 110 may provide (or offer to provide) a teleconference bridge in cause any of the first, second, third, and fourth users are unable to meet in-person.

In a third example approach, intent-based scheduling logic 110 analyzes communication(s) from a first user to infer from at least a first communication that the first user has an intent to perform an activity. In one illustration of this approach, first user may say, "I really should hit the gym during lunch today." In accordance with this illustration, intent-based scheduling logic 110 may infer from the first user's statement that the first user has an intent to work-out at the gym during lunch.

In accordance with this approach, intent-based scheduling logic 110 causes a digital personal assistant to automatically schedule a designated time on a visual representation of a calendar of the first user to perform the activity, including causing the digital personal assistant to automatically update the visual representation of the calendar to include a visual representation of the activity that is configured to indicate that the designated time is scheduled to perform the activity, based at least in part on an inference from at least the first communication that the first user has the intent to perform the activity. In the aforementioned illustration of this approach, assume that first user device 102A belongs to or is otherwise accessible to the first user. In accordance with this illustration, intent-based scheduling logic 110 may determine (e.g., infer) that the first user typically eats lunch at 1:30-2:15 pm. In accordance with this illustration, intent-based scheduling logic 110 may cause digital personal assistant 108A automatically schedule 1:30-2:15 pm on a visual representation of the first user's calendar to work-out at the gym. In further accordance with this illustration, intent-based scheduling logic 110 may cause digital personal assistant 108A to automatically update the visual representation of the first user's calendar to include a visual representation of the work-out (e.g., an appointment). In further accordance with this illustration, the visual representation of the work-out may be configured to indicate that 1:30-2:15 pm is scheduled to work-out at the gym.

In a fourth example approach, intent-based scheduling logic 110 analyzes instances of an action that are performed by a user (e.g., a user of first user device 102A) at respective historical time instances to identify a trend with regard to the instances of the action. In one illustration of this approach, the user may watch a television series at the 7:00 pm every Sunday. Intent-based scheduling logic 110 may analyze the instances in which the user watches the television series to determine a trend with regard to the user watching the television series. In accordance with this illustration, intent-based scheduling logic 110 may monitor the user's television watching habits to identify the trend.

In accordance with this approach, intent-based scheduling logic 110 causes a digital personal assistant to automatically schedule a designated time for the user to perform a future instance of the action in accordance with the trend, including causing the digital personal assistant to configure a visual representation of a calendar of the user to indicate that availability of the user at the designated time is tentative or booked. In the aforementioned illustration of this approach, assume that first user device 102A belongs to or is otherwise accessible to the user. In accordance with this illustration, intent-based scheduling logic 110 may cause digital personal assistant 108A to automatically schedule 7:00-7:30 pm next Sunday for the user to watch the television series in accordance with the trend. In further accordance with this illustration, intent-based scheduling logic 110 may cause digital personal assistant 108A to configure a visual representation of the user's calendar to indicate that availability of the user at 7:00-7:30 pm next Sunday is tentative or booked.

In some example embodiments, intent-based scheduling logic 110 gathers information about a user over time. In these embodiments, as intent-based scheduling logic 110 gathers the information over time, the accuracy of inferences to perform activities and the appropriateness of automatically proposed and/or scheduled times for performing the activities may be greater than the accuracy of previous inferences to perform activities and the appropriateness of times for performing the activities that were previously automatically proposed and/or scheduled. For instance, intent-based scheduling logic 110 may develop a model of the user or a group to which the user belongs. Intent-based scheduling logic 110 may develop and/or refine the model using online learning, for example.

Intent-based scheduling logic 110 may be implemented in various ways to perform intent-based scheduling via a digital personal assistant, including being implemented in hardware, software, firmware, or any combination thereof. For example, intent-based scheduling logic 110 may be implemented as computer program code configured to be executed in one or more processors. In another example, intent-based scheduling logic 110 may be implemented as hardware logic/electrical circuitry. For instance, intent-based scheduling logic 110 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Intent-based scheduling logic 110 is shown to be incorporated in first server(s) 106A for illustrative purposes and is not intended to be limiting. It will be recognized that intent-based scheduling logic 110 (or any portion(s) thereof) may be incorporated in any one or more of the user systems 102A-102M. For example, client-side aspects of intent-based scheduling logic 110 may be incorporated in one or more of the user systems 102A-102M, and server-side aspects of intent-based scheduling logic 110 may be incorporated in first server(s) 106A. In another example, intent-based scheduling logic 110 may be distributed among the user systems 102A-102M. In yet another example, intent-based scheduling logic 110 may be incorporated in a single one of the user systems 102A-102M. In another example, intent-based scheduling logic 110 may be distributed among the server(s) 106A-106N. In still another example, intent-based scheduling logic 110 may be incorporated in a single one of the server(s) 106A-106N.

In some example embodiments, user(s) may interact with a digital personal assistant via intent-based scheduling logic 110 using voice commands, gesture commands, touch commands, and/or hover commands. For example, any one or more of the user devices 102A-102M may have a microphone that is configured to detect voice commands. In another example, any one or more of the user devices 102A-102M may have a camera that is configured to detect gesture commands. In yet another example, any one or more of the user devices 102A-102M may have a touch screen that is configured to detect touch commands and/or hover commands. A hover command may include a hover gesture. A hover gesture can occur without a user physically touching the touch screen. Instead, the user's hand or portion thereof (e.g., one or more fingers) can be positioned at a spaced distance above the touch screen. The touch screen can detect that the user's hand (or portion thereof) is proximate the touch screen, such as through capacitive sensing. Additionally, hand movement and/or finger movement can be detected while the hand and/or finger(s) are hovering to expand the existing options for gesture input. Intent-based scheduling logic 110 may infer an intent of the user based at least in part on any of such voice, gesture, touch, and/or hover interactions.

Example techniques for performing intent-based scheduling via a digital personal assistant are discussed in greater detail below with reference to FIGS. 2-13.

Figure 2:
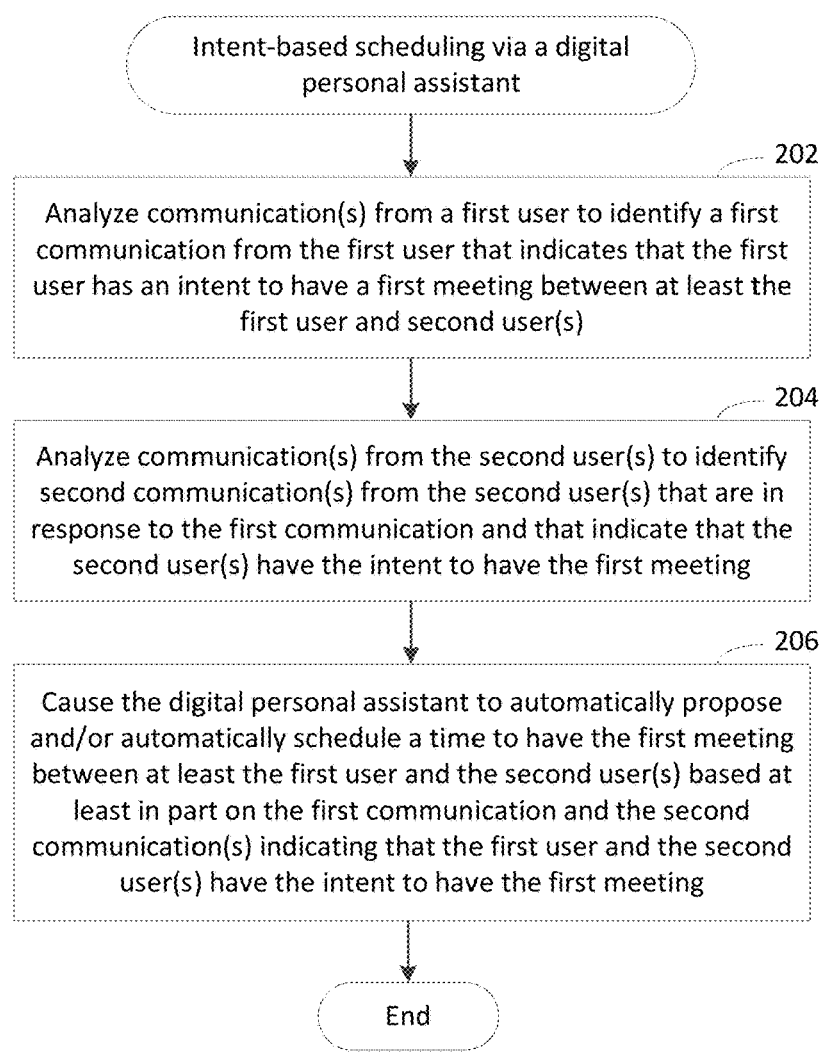
Figure 3:
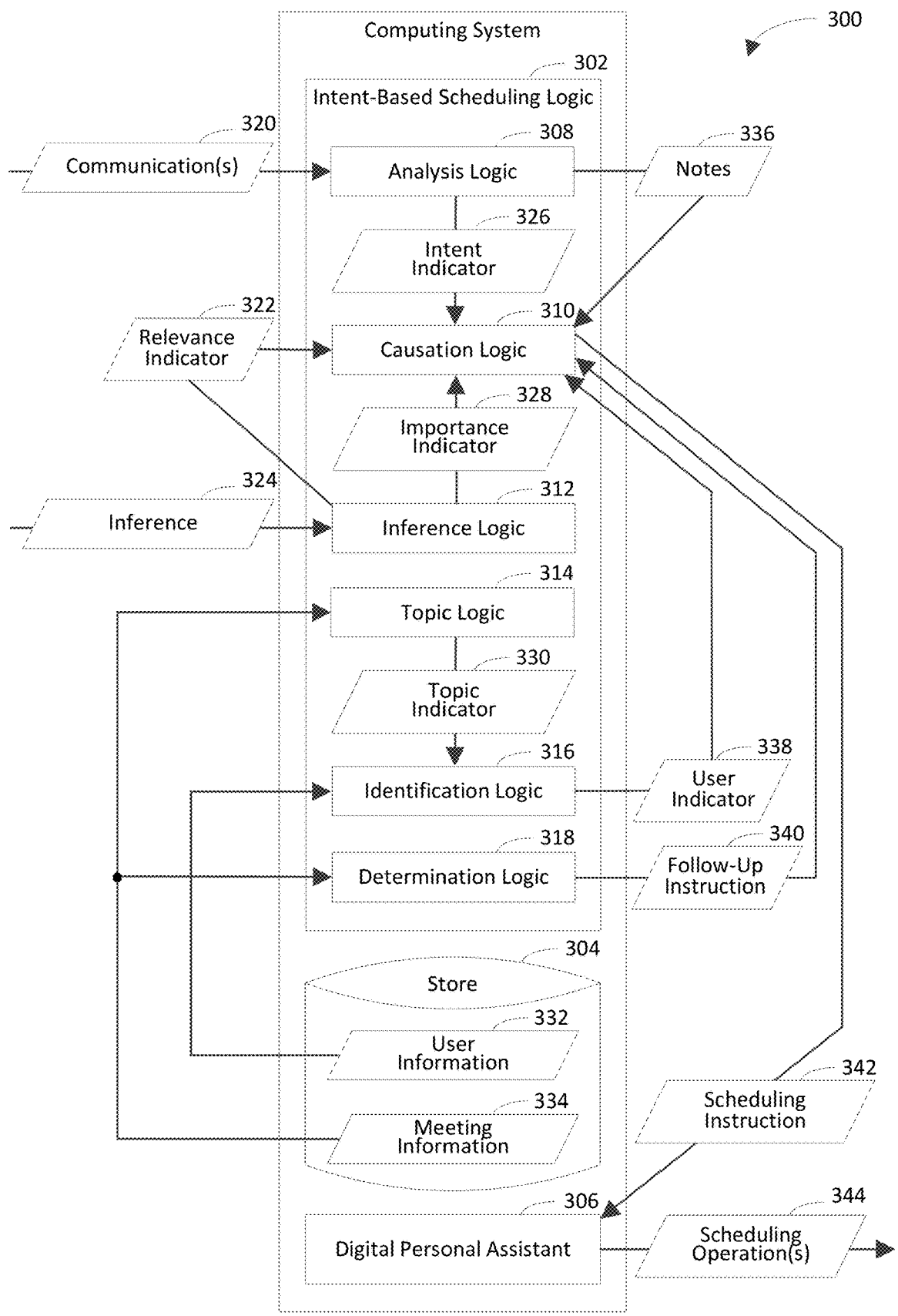

FIG. 2 depicts a flowchart 200 of an example method for performing intent-based scheduling via a digital personal assistant in accordance with an embodiment. Flowchart 200 may be performed by intent-based scheduling logic 110 shown in FIG. 1, for example. For illustrative purposes, flowchart 200 is described with respect to computing system 300 shown in FIG. 3. Computing system 300 may include one or more of user systems 102A-102M, one or more of server(s) 106A-106N, or any combination thereof, though the scope of the example embodiments is not limited in this respect. Computing system 300 includes intent-based scheduling logic 302, which is an example of intent-based scheduling logic 110, according to an embodiment. As shown in FIG. 3, computing system 300 further includes a store 304 and a digital personal assistant 306. Store 304 may be any suitable type of store, including but not limited to a database (e.g., a relational database, an entity-relationship database, an object database, an object relational database, an XML database, etc.). Intent-based scheduling logic 302 includes analysis logic 308, causation logic 310, inference logic 312, topic logic 314, identification logic 316, and determination logic 318. Further structural and operational embodiments will be apparent to persons skilled in the relevant art(s) based on the discussion regarding flowchart 200.

As shown in FIG. 2, the method of flowchart 200 begins at step 202. In step 202, communication(s) from a first user are analyzed (e.g., programmatically analyzed or processed) to identify a first communication from the first user that indicates that the first user has an intent to have a first meeting between at least the first user and second user(s). Examples of a communication include but are not limited to a telephone call, an in-person conversation, a conversation via a software application (e.g., Skype®, developed and distributed originally by Skype Technologies S.A.R.L. and subsequently by Microsoft Corporation; Whatsapp® Messenger, developed and distributed by WhatsApp Inc.; and Facebook® Messenger, developed and distributed by Facebook, Inc.), a voice mail, an email, a text message, a short message service (SMS) message, and a social update. In an example implementation, analysis logic 308 analyzes the communication(s) from the first user to identify the first communication that indicates that the first user has the intent to have the first meeting. For instance, communication(s) 320 may include the communication(s) from the first user. The communication(s) 320 may be received (e.g., detected or sensed) via any suitable interface, including but not limited to a sensor (e.g., a microphone) or a digital interface (e.g., a digital receiver). Analysis logic 308 may include one or more such interfaces.

Analysis logic 308 may use any of a variety of techniques to determine that the first communication indicates that the first user has the intent to have the first meeting. For example, analysis logic 308 may use natural language processing to infer the intent from the first communication. In accordance with this example, analysis logic 308 may use statistical analysis with regard to the communication(s) from the first user to determine likelihoods (e.g., statistical probabilities) that the first user has respective intents. Analysis logic 308 may compare each of the likelihoods to a likelihood threshold. A likelihood that is greater than or equal to the likelihood threshold may indicate that the first user has the intent with which the likelihood corresponds. A likelihood that is less than the likelihood threshold may indicate that the first user does not have the intent with which the likelihood corresponds. Accordingly, analysis logic 308 may determine that the first communication indicates that the first user has the intent to have the first meeting based at least in part on natural language processing of the first communication revealing that the likelihood that the first user has the intent to have the first meeting is greater than or equal to the likelihood threshold.

In another example, analysis logic 308 may analyze keywords in the first communication to determine that the first communication indicates that the first user has the intent to have the first meeting. In accordance with this example, analysis logic 308 may identify keywords in the communication(s) from the first user. Analysis logic 308 may compare keywords that are identified in the first communication to reference keywords to determine whether one or more of the keywords that are identified in the first communication are the same or semantically the same as one or more of the reference keywords. Each of the reference keywords may be associated with one or more intents. Accordingly, a keyword that is identified in the first communication being the same or semantically the same as a reference keyword may indicate that the first user has the intent(s) with which the reference keyword is associated.

In accordance with this example, one or more probabilities may be associated with each reference keyword. Each probability may indicate a likelihood that a user whose communication includes a keyword that matches the reference keyword has an intent with which the reference keyword is associated. Some reference keywords may be associated with one or more common (i.e., same) intent(s). Analysis logic 308 may determine a cumulative probability that a user has an intent by combining (e.g., adding) the probabilities regarding the intent that are associated with the various reference keywords based at least in part on keywords in the user's communication(s) matching the reference keywords. If the cumulative probability is greater than or equal to a probability threshold, the user may be deemed to have the intent. If the cumulative probability is less than the probability threshold, the user may be deemed to not have the intent.

Accordingly, analysis logic 308 may determine that the first communication from the first user indicates that the first user has the intent to have the first meeting based at least in part on a combination of probabilities regarding the intent, which are associated with reference keywords that match keywords in the first communication, being greater than or equal to a probability threshold. Analysis logic 308 may generate an intent indicator 326 to specify that the first user has the intent to have the first meeting.

At step 204, communication(s) from the second user(s) are analyzed to identify second communication(s) from the second user(s) that are in response to the first communication and that indicate that the second user(s) have the intent to have the first meeting. In an example implementation, analysis logic 308 analyzes the communication(s) from the second user(s) to identify the second communication(s) that indicate that the second user(s) have the intent to have the first meeting. For instance, the communication(s) 320 may include the communication(s) from the second user(s). In accordance with this implementation, the second communication(s) may confirm that the second user(s) share the first user's intent to have the first meeting. The intent indicator 326 may specify that the second user(s) have the intent to have the first meeting. For example, the intent indicator 326 may indicate that the first user and the second user(s) share the intent to have the first meeting. Analysis logic 308 may use any of a variety of techniques to determine that the second communication indicates that the second user(s) have the intent to have the first meeting, including but not limited to natural language processing and keyword analysis.

At step 206, the digital personal assistant is caused to automatically propose and/or automatically schedule a time to have the first meeting between at least the first user and the second user(s) based at least in part on the first communication and the second communication(s) indicating that the first user and the second user(s) have the intent to have the first meeting. In an example implementation, causation logic 310 causes digital personal assistant 306 to automatically propose and/or automatically schedule a time to have the first meeting between at least the first user and the second user(s) based at least in part on the first communication and the second communication(s) indicating that the first user and the second user(s) have the intent to have the first meeting. For example, causation logic 310 may cause digital personal assistant 306 to automatically propose and/or automatically schedule the time to have the first meeting in response to receipt of the intent indicator 326. In accordance with this example, causation logic 310 may cause digital personal assistant 306 to automatically propose and/or automatically schedule the time based at least in part on the intent indicator 326 specifying that the first user and the second user(s) have the intent to have the first meeting. For instance, causation logic 310 may cause digital personal assistant 306 to automatically propose and/or automatically schedule the time based at least in part on the intent indicator 326 indicating that the second user(s) share the first user's intent to have the first meeting.

Causation logic 310 may cause digital personal assistant 306 to automatically propose and/or automatically schedule the time to have the first meeting between at least the first user and the second user(s) in any of a variety of ways. For instance, causation logic 310 may generate a scheduling instruction 342 in response to the receipt of the intent indicator 326. The scheduling instruction 342 instructs digital personal assistant 306 to perform scheduling operation(s) 344. The scheduling operation(s) 344 include automatically proposing and/or automatically scheduling the time to have the first meeting between at least the first user and the second user(s).

In an example embodiment, causing the digital personal assistant to automatically propose and/or automatically schedule the time to have the first meeting at step 206 includes causing the digital personal assistant to automatically schedule the time to have the first meeting. In accordance with this embodiment, the digital personal assistant is caused to automatically configure a visual representation of calendar(s) of the respective second user(s) to indicate that attendance of the second user(s) at the meeting is tentative. In an aspect of this embodiment, another digital personal assistant may be caused to automatically configure a visual representation of a calendar of the first user to indicate that attendance of the first user at the meeting is tentative.

In some example embodiments, one or more steps 202, 204, and/or 206 of flowchart 200 may not be performed. Moreover, steps in addition to or in lieu of steps 202, 204, and/or 206 may be performed. For instance, in an example embodiment, the method of flowchart 200 further includes determining a topic of the first meeting. For example, topic logic 314 may determine the topic of the first meeting. In accordance with this example, store 304 may store meeting information 334. The meeting information 334 may include topic information regarding the topic of the first meeting. Topic logic 314 may receive (e.g., collect, retrieve) at least the topic information. Topic logic 314 may determine the topic of the first meeting based at least in part on the topic information specifying the topic of the first meeting. Topic logic 314 may generate a topic indicator 330 in response to determining the topic of the first meeting. The topic indicator 330 may specify the topic of the first meeting.

In accordance with this embodiment, the method of flowchart 200 further includes identifying a third user who has an attribute that corresponds to the topic. For example, identification logic 316 may identify the third user. In accordance with this example, store 304 may store user information 332. The user information 332 may include cross-reference information that cross-references attributes of users and topics. Accordingly, each user may have one or more attributes, each of which may correspond to one or more of the topics. Identification logic 316 may review the cross-reference information to determine that attribute(s) of the third user correspond to the topic of the first meeting. For instance, identification logic 316 may review the cross-reference information to find the topic of the first meeting among the topics that are listed in the cross-reference information. Identification logic 316 may then determine which attributes of the users are indicated by the cross-reference information to be cross-referenced with the topic. The attribute of the third user may be among the attributes of the users that are indicated by the cross-reference information to be cross-referenced with the topic. Identification logic 316 may identify the third user based at least in part on the attribute of the third user being cross-referenced with the topic of the first meeting by the cross-reference information. Identification logic 316 may generate a user indicator 338 in response to identifying the third user. The user indicator 338 may specify that the third user has an attribute that corresponds to the topic of the first meeting.

In further accordance with this embodiment, the method of flowchart 200 further includes causing the digital personal assistant to suggest that the third person be invited to the first meeting based at least in part on the third user having the attribute that corresponds to the topic. For example, causation logic 310 may cause digital personal assistant 306 to suggest that the third user be invited to the first meeting. In accordance with this example, causation logic 310 may cause the digital personal assistant 306 to suggest that the third user be invited to the first meeting based at least in part on the user indicator 338 specifying that the third user has an attribute that corresponds to the topic of the first meeting.

In another example embodiment, the method of flowchart 200 further includes inferring that a document is relevant to the first meeting. For example, inference logic 312 may infer that the document is relevant to the first meeting. Accordingly, inference logic 312 may determine that the document is relevant to the first meeting based on an inference 324, which indicates that the document is relevant to the first meeting. Inference logic 312 may generate a relevance indicator 322 in response to inferring that the document is relevant to the first meeting and/or an importance indicator 328. The relevance indicator 322 may specify that the document is relevant to the first meeting.

In accordance with this embodiment, the method of flowchart 200 further includes causing the digital personal assistant to attach (e.g., automatically attach) the document to a calendar entry that represents the first meeting based at least in part on an inference that the document is relevant to the first meeting. For example, causation logic 310 may cause digital personal assistant 306 to attach the document to the calendar entry based at least in part on the inference 324.

In an aspect of this embodiment, inferring that the document is relevant to the first meeting includes determining a topic of the first meeting. For instance, topic logic 314 may determine the topic of the first meeting. In accordance with this aspect, inferring that the document is relevant to the first meeting further includes determining attributes of multiple documents. For example, inference logic 312 may determine the attributes of the documents. In further accordance with this aspect, inferring that the document is relevant to the first meeting further includes determining that an attribute of the document corresponds to the topic. For instance, inference logic 312 may determine that the attribute of the document corresponds to the topic. In further accordance with this aspect, causing the digital personal assistant to attach the document to the calendar entry includes causing the digital personal assistant to attach the document to the calendar entry based at least in part on the attribute of the document corresponding to the topic.

In yet another example embodiment, the method of flowchart 200 further includes inferring a title of the first meeting from (a) at least one of the communication(s) from the first user and/or (b) at least one of the communication(s) from the second user(s). For example, inference logic 312 may infer the title of the first meeting from the communication(s) 320, including at least one of the communication(s) from the first user and/or at least one of the communication(s) from the second user(s). In accordance with this example, the inference 324 may indicate the title. In an aspect of this example, causing the digital personal assistant to automatically propose and/or automatically schedule the time to have the first meeting at step 206 may include generating (e.g., automatically generating) an invitation to the first meeting that specifies the title of the first meeting, which is inferred from (a) at least one of the communication(s) from the first user and/or (b) at least one of the communication(s) from the second user(s).

In still another example embodiment, the method of flowchart 200 further includes inferring an agenda of the first meeting from (a) at least one of the communication(s) from the first user and/or (b) at least one of the communication(s) from the second user(s). For example, inference logic 312 may infer the agenda of the first meeting from the communication(s) 320, including at least one of the communication(s) from the first user and/or at least one of the communication(s) from the second user(s). In accordance with this example, the inference 324 may indicate the agenda. In an aspect of this example, causing the digital personal assistant to automatically propose and/or automatically schedule the time to have the first meeting at step 206 may include generating (e.g., automatically generating) an invitation to the first meeting that specifies the agenda of the first meeting, which is inferred from (a) at least one of the communication(s) from the first user and/or (b) at least one of the communication(s) from the second user(s).

In another example embodiment, the method of flowchart 200 further includes automatically generating notes from communications among at least the first user and the second user(s) that occur during the meeting. For instance, analysis logic 308 may generate notes 336 from the communication(s) 320, which may include the communications among at least the first user and the second user(s) that occur during the meeting. In accordance with this embodiment, the method of flowchart 200 further includes causing the digital personal assistant to provide the notes to (a) the first user and/or (b) at least one of the second user(s) in response to automatically generating the notes. For example, causation logic 310 may cause digital personal assistant 306 to provide the notes 336 to the first user and/or at least one of the second user(s) in response to receipt of the notes 336 from analysis logic 308.

In yet another example embodiment, the method of flowchart 200 further includes determining that an amount of information that is to be discussed during the first meeting is not capable of being discussed within an amount of time that is allocated for the first meeting. For example, determination logic 318 may determine that the amount of information that is to be discussed during the first meeting is not capable of being discussed within the amount of time that is allocated for the first meeting. In accordance with this example, determination logic 318 may generate a follow-up instruction 340 in response to determining that the amount of information that is to be discussed during the first meeting is not capable of being discussed within the amount of time that is allocated for the first meeting. The follow-up instruction 340 may specify that a follow-up meeting is to be scheduled. For instance, the follow-up instruction 340 may instruct causation logic 310 to cause digital personal assistant 306 to schedule the follow-up meeting for discussion of the information that is not discussed during the first meeting.

In accordance with this embodiment, the method of flowchart 200 further includes causing the digital personal assistant to automatically schedule a follow-up meeting for discussion of the information that is not discussed during the first meeting. For example, causation logic 310 may cause digital personal assistant 306 to automatically schedule the follow-up meeting. In accordance with this example, causation logic 310 may cause digital personal assistant 306 to automatically schedule the follow-up meeting in response to receipt of the follow-up instruction 340. For instance, causation logic 310 may cause digital personal assistant 306 to automatically schedule the follow-up meeting based at least in part on the follow-up instruction 340 specifying that the follow-up meeting is to be scheduled.

In still another example embodiment, the method of flowchart 200 further includes automatically monitoring conversations between the first user and other user(s) across multiple types of communication channels. Examples of a type of communication channel include but are not limited to a wired or wireless telephone connection, an in-person communication channel, a software application (e.g., Skype®, Whatsapp® Messenger, or Facebook® Messenger), an email communication channel, a text messaging communication channel, an SMS communication channel, and a social update communication channel. In an example, analysis logic 308 may automatically monitor the conversations between the first user and the other user(s) across the types of communication channels. In an aspect of this example, analysis logic 308 ambiently monitors the conversations, such that analysis logic 308 serves as a third-party observer that does not participate in the conversations. In accordance with this aspect, analysis logic 308 may operate in an "always on" (a.k.a. "always listening") state in which analysis logic 308 continuously monitors for audio and/or visual inputs. By operating in the "always on" state, analysis logic 308 may detect communications that are directed to or from the first user across any one or more of the types of communication channels in absence of an instruction from the first user to do so.

In accordance with this embodiment, the communication(s) from the first user, which are analyzed at step 202, include communications that are from the conversations and that are received via the types of communication channels. For example, the communication(s) 320 may include communications from the conversations between the first user and the other user(s) and that are received via the types of communication channels. In accordance with this example, a first subset of the communications may be received via a first type of communication channel. A second subset of the communications may be received via a second type of communication channel, which is different from the first type, and so on.

In another example embodiment, the method of flowchart 200 further includes inferring an importance of the first meeting. For example, the importance of the first meeting may be inferred from communication(s) regarding the first meeting, a frequency of interaction between the first user and at least one of the second user(s), a number of interactions between the first user and at least one of the second user(s), an amount of time that the first user and at least one of the second user(s) spend together (e.g., working on projects, in a social setting, at work, or in total), a relationship between the first user and at least one of the second user(s), a number of projects that the first user has with at least one of the second user(s), an association of the first user and/or at least one of the second user(s) with a project to which the first meeting pertains, an amount of time the first user and/or at least one of the second users devotes to subject matter that is to be discussed at the first meeting, and/or an extent of knowledge that the first user and/or at least one of the second user(s) has regarding subject matter of the first meeting. A relationship of the first user with any one or more of the second user(s) may be determine by reviewing a family diagram or an organizational diagram that is associated with the first user. The family diagram may specify familial relationships between members in a family of the first user. The organization diagram may specify a hierarchy of employees in a company with which the first user is employed. The family diagram and/or the organizational diagram may be inferred by inference logic 312 or retrieved from store 304 by identification logic 316, though the scope of the example embodiments is not limited in this respect. In an example implementation, inference logic 312 infers the importance of the first meeting.

In a first aspect of this embodiment, causing the digital personal assistant to automatically propose and/or automatically schedule the time to have the first meeting includes causing the digital personal assistant to automatically reduce a duration of a second meeting to accommodate the first meeting based at least in part on an inference that the importance of the first meeting is greater than an importance of the second meeting. For example, the importance of the second meeting may be inferred based at least in part on who proposed the second meeting. In accordance with this example, causing the digital personal assistant to automatically reduce the duration of the second meeting may be performed in response to inferring the importance of the second meeting. In another example, causing the digital personal assistant to automatically reduce the duration of the second meeting may include automatically changing a representation of the second meeting on a visual representation of a calendar of the first user and/or at least one of the second user(s) to indicate that the duration of the second meeting is reduced.

In another aspect of this embodiment, causing the digital personal assistant to automatically propose and/or automatically schedule the time to have the first meeting includes causing the digital personal assistant to automatically cancel a second meeting to accommodate the first meeting based at least in part on an inference that the importance of the first meeting is greater than an importance of the second meeting. For instance, causing the digital personal assistant to automatically cancel the second meeting may include automatically deleting a representation of the second meeting from a visual representation of a calendar of the first user and/or at least one of the second user(s) to indicate that the second meeting is cancelled.

In yet another aspect of this embodiment, causing the digital personal assistant to automatically propose and/or automatically schedule the time to have the first meeting includes causing the digital personal assistant to automatically reschedule and/or automatically propose to reschedule a second meeting to accommodate the first meeting based at least in part on an inference that the importance of the first meeting is greater than an importance of the second meeting. For example, causing the digital personal assistant to automatically reschedule and/or automatically propose to reschedule the second meeting includes causing the digital personal assistant to automatically reschedule and/or automatically propose to reschedule the second meeting at which the first user is scheduled to attend to accommodate the first meeting based at least in part on an inference that the importance of the first meeting to the first user is greater than the importance of the second meeting to the first user. In another example, causing the digital personal assistant to automatically reschedule and/or automatically propose to reschedule the second meeting includes causing the digital personal assistant to automatically reschedule and/or automatically propose to reschedule the second meeting at which at least one of the second user(s) is scheduled to attend to accommodate the first meeting based at least in part on an inference that the importance of the first meeting to the at least one second user is greater than the importance of the second meeting to the at least one second user.

In an example of this aspect, causing the digital personal assistant to automatically reschedule and/or automatically propose to reschedule the second meeting includes causing the digital personal assistant to automatically reschedule the second meeting to accommodate the first meeting. In accordance with this example, causing the digital personal assistant to automatically reschedule the second meeting to accommodate the first meeting may include one or more of the steps shown in flowchart 400 of FIG. 4. Flowchart 400 may be performed by causation logic 310 shown in FIG. 3, for example. For illustrative purposes, flowchart 400 is described with respect to causation logic 500 of FIG. 5, which is an example of causation logic 310, according to an embodiment. As shown in FIG. 5, causation logic 500 includes a calendar analyzer 502, an inquiry provider 504, and a time changer 506. Further structural and operational embodiments will be apparent to persons skilled in the relevant art(s) based on the discussion regarding flowchart 400.

Before discussing flowchart 400, it should be mentioned that computing system 300 may not include one or more of intent-based scheduling logic 302, store 304, digital personal assistant 306, analysis logic 308, causation logic 310, inference logic 312, topic logic 314, identification logic 316, and/or determination logic 318. Furthermore, computing system 300 may include components in addition to or in lieu of intent-based scheduling logic 302, store 304, digital personal assistant 306, analysis logic 308, causation logic 310, inference logic 312, topic logic 314, identification logic 316, and/or determination logic 318.

Figure 4:
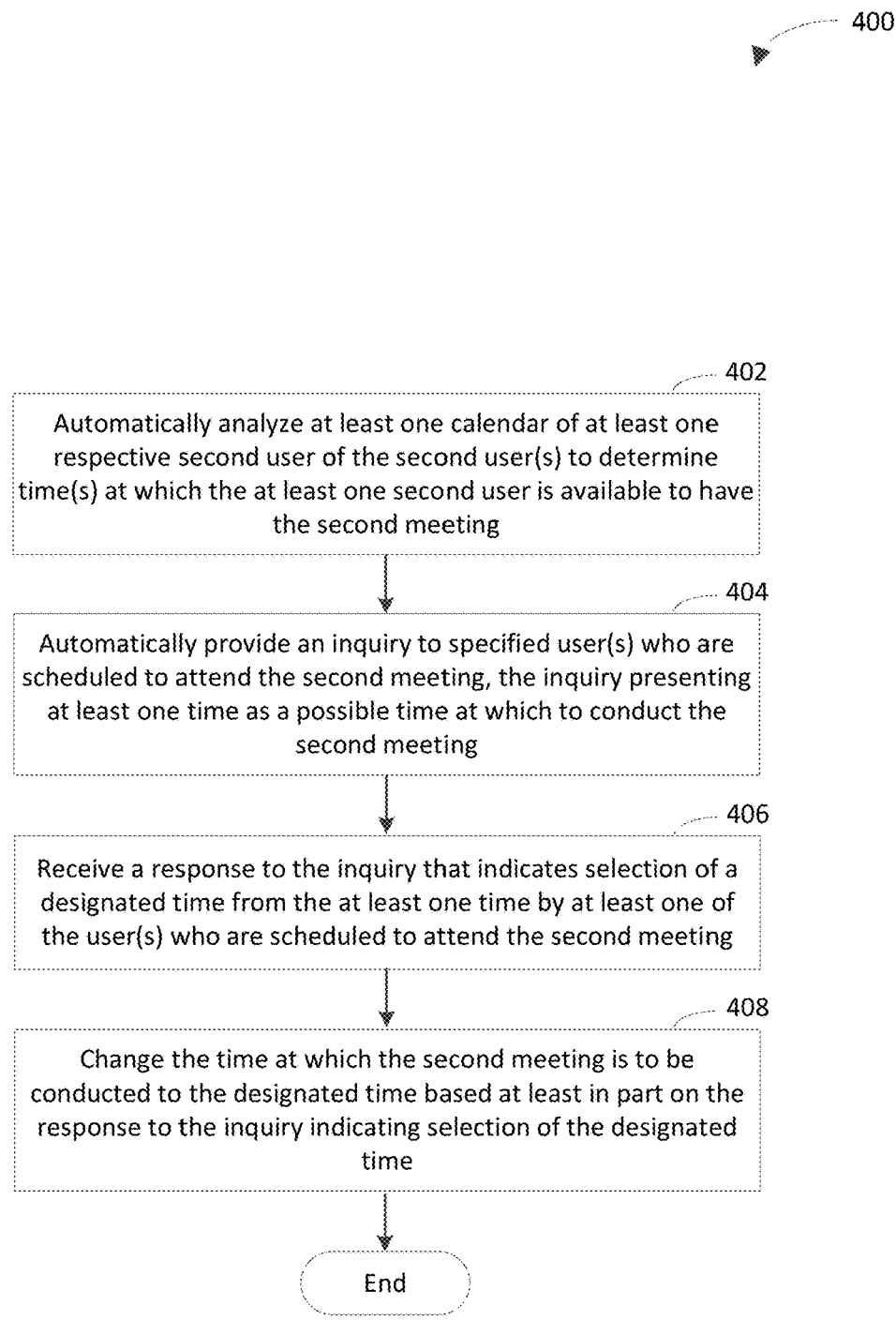
FIG. 4 depicts a flowchart of an example method for causing a digital personal assistant to automatically reschedule a meeting in accordance with an embodiment.
Figure 5:
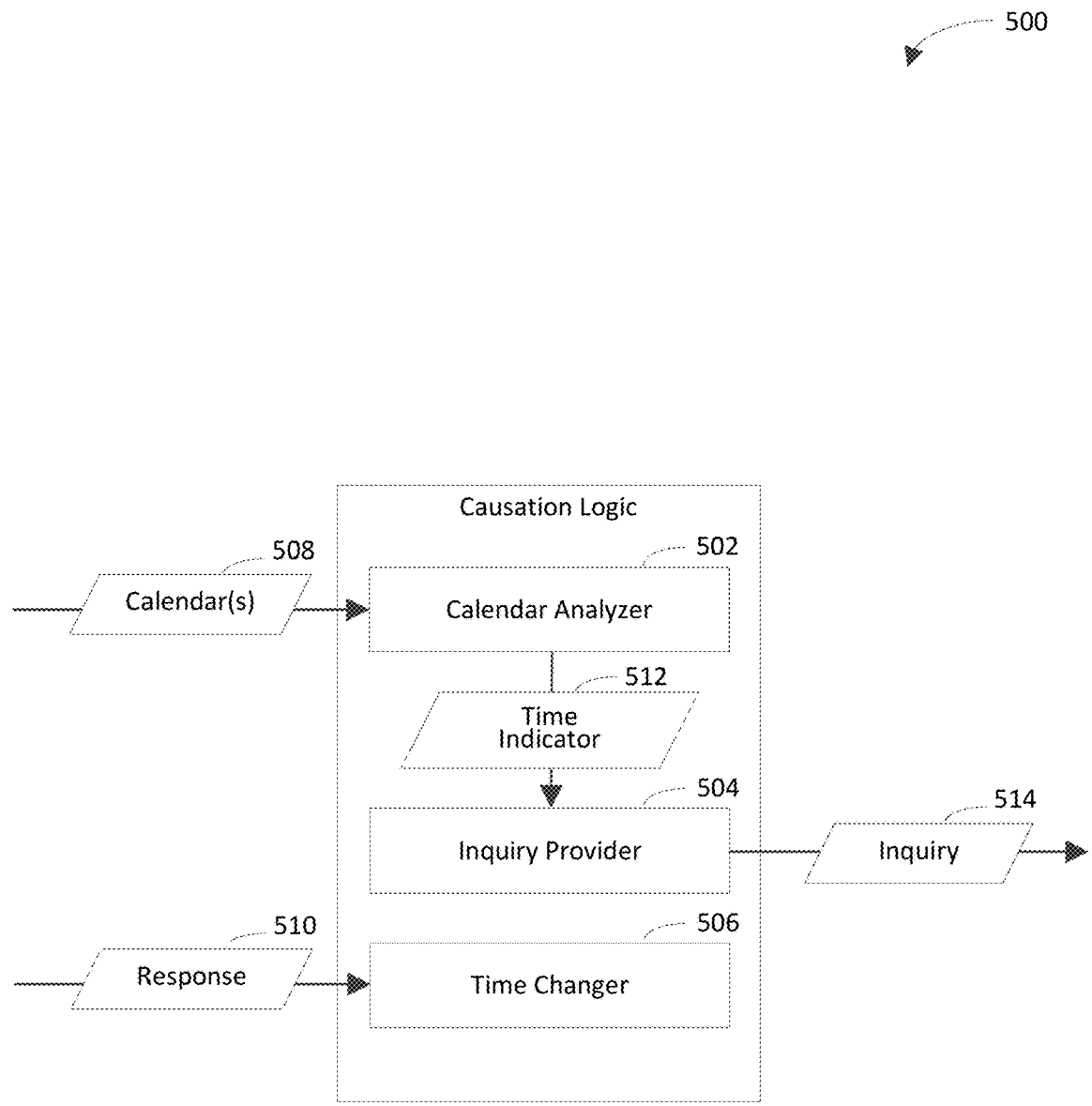
FIG. 5 is a block diagram of an example implementation of causation logic shown in FIGS. 3, 8, 10, and 12 in accordance with embodiments.

As shown in FIG. 4, the method of flowchart 400 begins at step 402. In step 402, at least one calendar of at least one respective second user of the second user(s) is automatically analyzed to determine time(s) at which the at least one second user is available to have the second meeting. In an example implementation, calendar analyzer 502 automatically analyzes calendar(s) 508 of at least one second user to determine the time(s) at which the at least one second user is available to have the second meeting. Calendar analyzer 502 may generate a time indicator 512 in response to determining the time(s) at which the at least one second user is available to have the second meeting. The time indicator 512 may specify the time(s) at which the at least one second user is available to have the second meeting.

At step 404, an inquiry is automatically provided to specified user(s) who are scheduled to attend the second meeting. The inquiry presents at least one time as a possible time at which to conduct the second meeting. In an example implementation, inquiry provider 504 automatically provides an inquiry 514 to the specified user(s) who are scheduled to attend the second meeting. The inquiry presents at least one time as a possible time at which to conduct the second meeting.

At step 406, a response to the inquiry is received that indicates selection of a designated time from the at least one time by at least one of the user(s) who are scheduled to attend the second meeting. In an example implementation, time changer 506 receives a response 510 to the inquiry 514 that indicates selection of the designated time from the at least one time.

At step 408, the time at which the second meeting is to be conducted is changed to the designated time based at least in part on the response to the inquiry indicating selection of the designated time. In an example implementation, time changer 506 changes the time at which the second meeting is to be conducted to the designated time based at least in part on the response 510 to the inquiry 514 indicating the selection of the designated time. For instance, time changer 506 may access calendar(s) (e.g., electronic calendar(s) in calendar application(s)) of at least one second user and/or at least one of the specified user(s) to update the time at which the second meeting is to be conducted to the designated time in the calendar(s).

It will be recognized that causation logic 500 may not include one or more of calendar analyzer 502, inquiry provider 504, and/or time changer 506. Furthermore, causation logic 500 may include components in addition to or in lieu of calendar analyzer 502, inquiry provider 504, and/or time changer 506.

Figure 6:
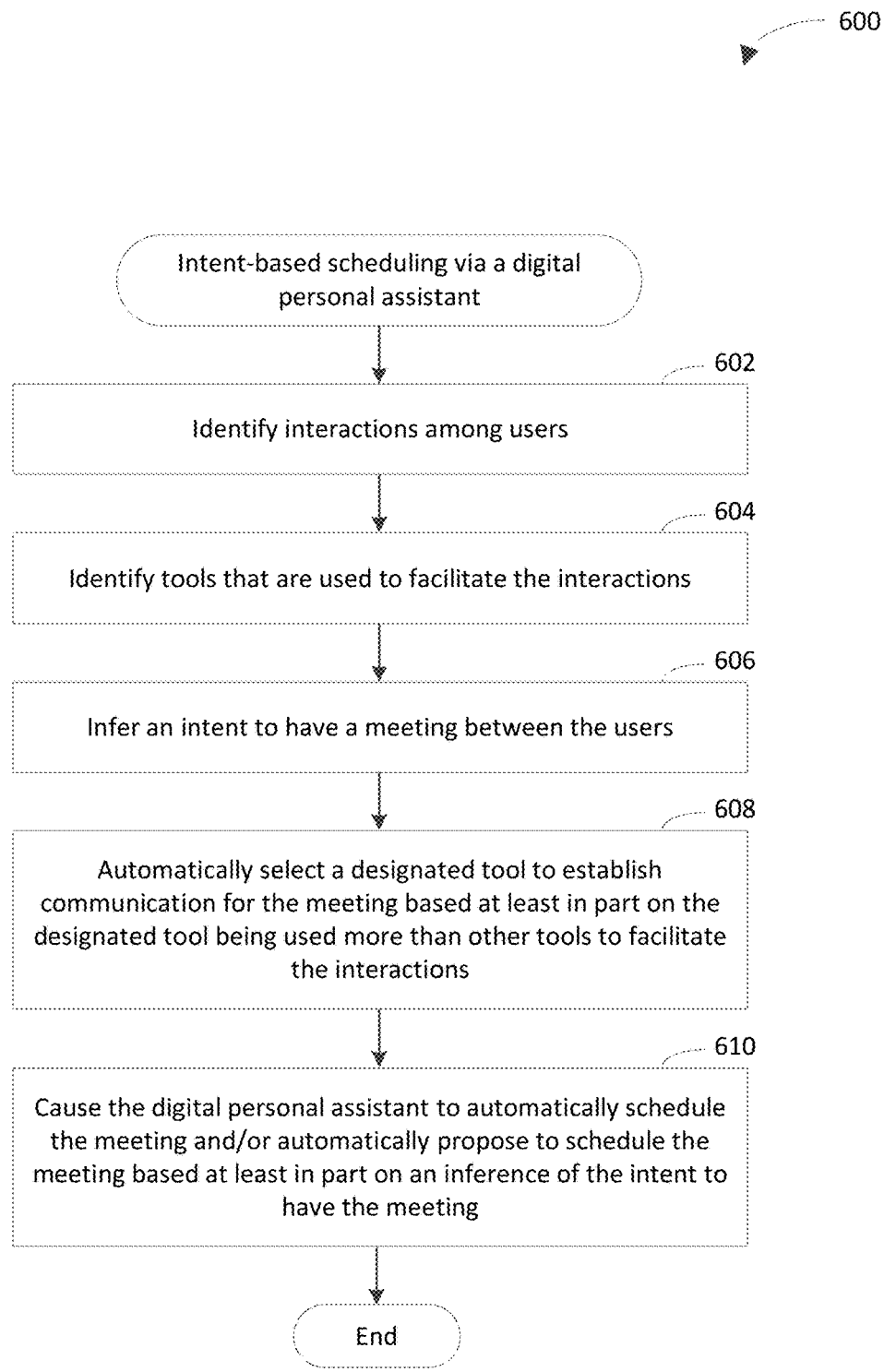
Figure 7:
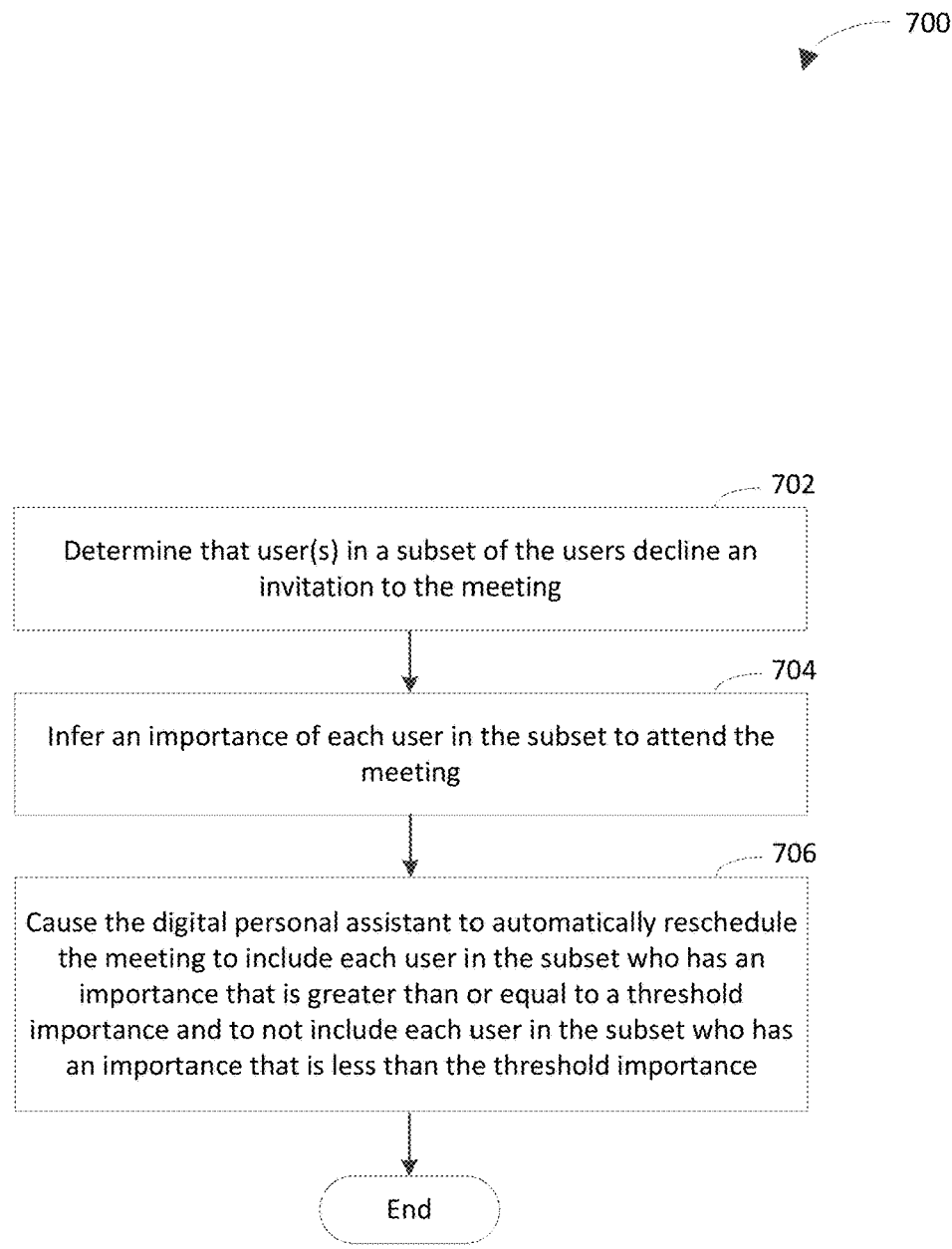
Figure 8:
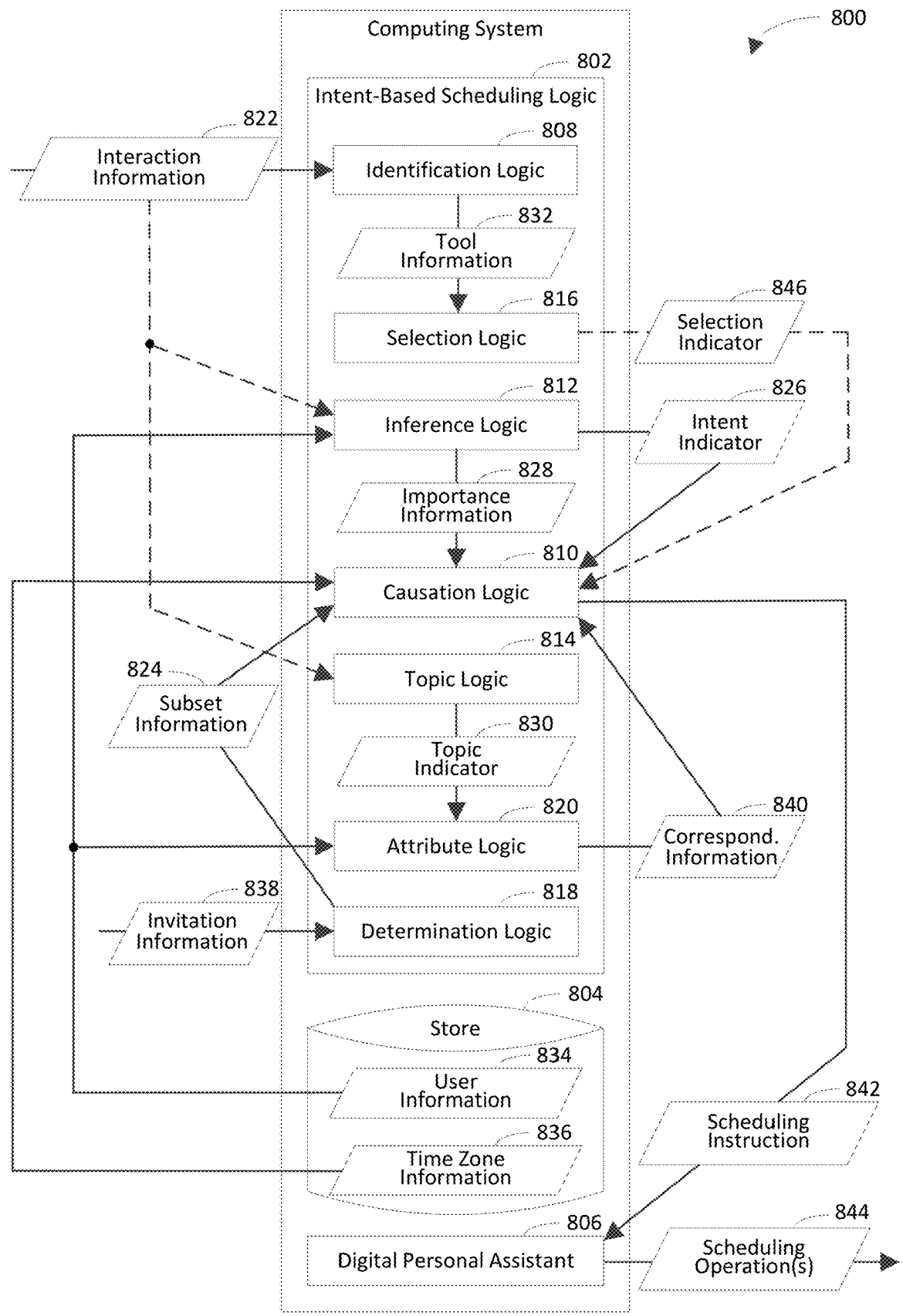

FIGS. 6-7 depict flowcharts 600 and 700 of other example methods for performing intent-based scheduling via a digital personal assistant in accordance with embodiments. Flowcharts 600 and 700 may be performed by intent-based scheduling logic 110 shown in FIG. 1, for example. For illustrative purposes, flowcharts 600 and 700 are described with respect to computing system 800 shown in FIG. 8. Computing system 800 may include one or more of user systems 102A-102M, one or more of server(s) 106A-106N, or any combination thereof, though the scope of the example embodiments is not limited in this respect. Computing system 800 includes intent-based scheduling logic 802, which is an example of intent-based scheduling logic 110, according to an embodiment. As shown in FIG. 8, computing system 800 further includes a store 804 and a digital personal assistant 806. Intent-based scheduling logic 802 includes identification logic 808, causation logic 810, inference logic 812, topic logic 814, selection logic 816, determination logic 818, and attribute logic 820. Further structural and operational embodiments will be apparent to persons skilled in the relevant art(s) based on the discussion regarding flowcharts 600 and 700.

As shown in FIG. 6, the method of flowchart 600 begins at step 602. In step 602, interactions among users are identified. Examples of an interaction include but are not limited to a meeting and a conversation. In an example implementation, identification logic 808 identifies the interactions among the users. For example, identification logic 808 may receive interaction information 822. Interaction information 822 may include a representation of content of the interactions, indications of tools that are used to facilitate the interactions, information regarding which of the users initiates each interaction, and information regarding which of the users participate in each interaction. The interaction information 822 may include an audio representation of one or more of the interactions, a video representation of one or more of the interactions, and/or a textual representation of one or more of the transactions. The interaction information 822 may include a transcription of one or more of the interactions, keywords extracted from one or more of the interactions, etc.

At step 604, tools that are used to facilitate the interactions are identified. In an example implementation, identification logic 808 identifies the tools that are used to facilitate the interactions. For example, identification logic

808 may identify the tools in response to receipt of the interaction information 822. In accordance with this example, the interaction information 822 may indicate (e.g., specify) the tools that are used to facilitate the interactions. Identification logic 808 may generate tool information 832 in response to receipt of the interaction information 822. The tool information 832 may specify the tools that are used to facilitate the interactions. For instance, tool information 832 may specify one or more tools that are used to facilitate each of the interactions. Examples of a tool include but are not limited to a telephone, a software application (e.g., Skype®, Whatsapp® Messenger, or Facebook® Messenger), email, text message, SMS message, teleconference bridge, in-person (a.k.a. face-to-face) engagement, and a location (e.g., room) in which an interaction occurs.

At step 606, an intent to have a meeting between the users is inferred (e.g., programmatically inferred). For example, the intent to have the meeting may be inferred from communications among at least some of the users, historical interactions among at least some of the users, a corporate announcement that affects project(s) to which the users contribute, a milestone, etc. Examples of a milestone include but are not limited to an anniversary, a birthday, and achieving a corporate goal (e.g., reaching a threshold number of sales or a threshold revenue). In an example implementation, inference logic 812 infers the intent to have the meeting. For instance, inference logic 812 may infer the intent from the interaction information 822. Inference logic 812 may generate intent indicator 826 in response to inferring the intent. The intent indicator 826 specifies the intent to have the meeting between the users.

At step 608, a designated tool is automatically selected to establish communication for the meeting based at least in part on the designated tool being used more (e.g., more often or more frequently) than other tools to facilitate the interactions. In an example implementation, selection logic 816 selects the designated tool to establish communication for the meeting. Selection logic 816 may select the designated tool in response to receipt of the tool information 832. For instance, selection logic 816 may analyze the tool information 832 to determine that the designated tool is used more than the other tools to facilitate the interactions. Selection logic 816 may generate a selection indicator 846 in response to automatically selecting the designated tool. The selection indicator 846 may specify that the designated tool is selected to establish communication for the meeting. The selection indicator 846 may instruct causation logic 810 to cause digital personal assistant 806 to use the designated tool to establish communication for the meeting.

At step 610, the digital personal assistant is caused to automatically schedule the meeting and/or automatically propose to schedule the meeting based at least in part on an inference of the intent to have the meeting. In an example implementation, causation logic 810 causes digital personal assistant 806 to automatically schedule the meeting and/or automatically propose to schedule the meeting. For example, causation logic 810 may cause digital personal assistant 806 to automatically schedule the meeting and/or automatically propose to schedule the meeting to use the designated tool to establish communication for the meeting. In accordance with this example, causation logic 810 may configure a connection that utilizes the designated tool for use during the meeting in order to enable communication via the connection to occur during the meeting. Causation logic 810 may cause digital personal assistant 806 to automatically schedule the meeting and/or automatically propose to schedule the meeting in response to receipt of the intent indicator 826.

For instance, causation logic 810 may cause digital personal assistant 806 to automatically schedule the meeting and/or automatically propose to schedule the meeting based at least in part on the intent indicator 826 specifying the intent to have the meeting between the users.

Causation logic 810 may cause digital personal assistant 806 to automatically schedule the meeting and/or automatically propose to schedule the meeting in any of a variety of ways. For instance, causation logic 810 may generate a scheduling instruction 842 in response to the receipt of the intent indicator 826. The scheduling instruction 842 instructs digital personal assistant 806 to perform scheduling operation(s) 844. The scheduling operation(s) 844 include automatically scheduling the meeting and/or automatically proposing to schedule the meeting.

In some example embodiments, one or more steps 602, 604, 606, 608, and/or 610 of flowchart 600 may not be performed. Moreover, steps in addition to or in lieu of steps 602, 604, 606, 608, and/or 610 may be performed. For instance, in an example embodiment, the method of flowchart 600 further includes determining a topic of the meeting. For example, topic logic 814 may determine the topic of the meeting. In accordance with this example, topic logic 814 may determine the topic of the meeting based at least in part on the interaction information 822 indicating (e.g., specifying) the topic of the meeting. For instance, topic logic 814 may infer the topic of the meeting from the interaction information 822. Topic logic 814 may generate a topic indicator 830 in response to determining the topic of the meeting. The topic indicator 830 may specify the topic of the meeting.

In a first aspect of this embodiment, the method of flowchart 600 further includes determining that attribute(s) of a designated user correspond to the topic. In an example implementation, attribute logic 820 determines that the attribute(s) of the designated user correspond to the topic. In accordance with this implementation, store 804 stores user information 834. Attribute logic 820 may receive (e.g., collect, retrieve) the user information 834 from store 804. The user information 834 may specify attributes of the users. For instance, the user information 834 may specify one or more attributes for each of the users. The user information 834 may include cross-reference information that cross-references the attributes of the users and topics. Accordingly, each attribute of a user may correspond to one or more of the topics. Attribute logic 820 may review the cross-reference information to determine that the attribute(s) of the designated user correspond to the topic of the meeting.

For instance, attribute logic 820 may review the topic indicator 830 to determine the topic of the meeting. Attribute logic 820 may review the cross-reference information to find the topic of the meeting among the topics that are listed in the cross-reference information. Attribute logic 820 may then determine which attributes of the users are indicated by the cross-reference information to be cross-referenced with the topic of the meeting. The attribute(s) of the designated user may be among the attributes of the users that are indicated by the cross-reference information to be cross-referenced with the topic of the meeting. Attribute logic 820 may determine that the attribute(s) of the designated user correspond to the topic of the meeting based at least in part on the attribute(s) of the designated user being cross-referenced with the topic of the meeting by the cross-reference information. Attribute logic 820 may generate correspondence information 840 in response to determining that the attribute(s) of the designated user correspond to the topic of the meeting. The correspondence information 840 may specify that the attribute(s) of the designated user correspond to the topic of the meeting.

In accordance with this aspect, causing the digital personal assistant to automatically schedule the meeting and/or automatically propose to schedule the meeting at step 610 includes causing the digital personal assistant to automatically schedule the meeting, including causing the digital personal assistant to automatically specify that attendance of the designated user at the meeting is required based at least in part on the attribute(s) of the designated user corresponding to the topic. For example, causation logic 810 may cause digital personal assistant 806 to automatically specify that attendance of the designated user at the meeting is required in response to receipt of the correspondence information 840. In accordance with this example, causation logic 810 may cause digital personal assistant 806 to automatically specify that attendance of the designated user at the meeting is required based at least in part on the correspondence information 840 specifying that the attribute(s) of the designated user correspond to the topic of the meeting.

In a second aspect of this embodiment, the method of flowchart 600 further includes determining that a designated user does not have at least one attribute that corresponds to the topic. In an example implementation, attribute logic 820 determines that the designated user does not have at least one attribute that corresponds to the topic. In accordance with this implementation, attribute logic 820 may review cross-reference information, which is included in the user information 834, to determine that the designated user does not have at least one attribute that corresponds to the topic.

For instance, attribute logic 820 may review the topic indicator to determine the topic of the meeting. Attribute logic 820 may review the cross-reference information to find the topic of the meeting among the topics that are listed in the cross-reference information. Attribute logic 820 may then determine which attributes of the users are indicated by the cross-reference information to be cross-referenced with the topic of the meeting. No attributes of the designated user may be among the attributes of the users that are indicated by the cross-reference information to be cross-referenced with the topic of the meeting. Attribute logic 820 may determine that the designated user does not have at least one attribute that corresponds to the topic based at least in part on the designated user not having any attributes that are indicated by the cross-reference information to be cross-referenced with the topic of the meeting. Attribute logic 820 may generate correspondence information 840 in response to determining that the designated user does not have at least one attribute that corresponds to the topic. The correspondence information 840 may specify that the designated user does not have at least one attribute that corresponds to the topic.

In an example of this aspect, causing the digital personal assistant to automatically schedule the meeting and/or automatically propose to schedule the meeting at step 610 includes causing the digital personal assistant to automatically schedule the meeting, including causing the digital personal assistant to automatically specify that attendance of the designated user at the meeting is optional based at least in part on the designated user not having at least one attribute that corresponds to the topic.

In another example of this aspect, causing the digital personal assistant to automatically schedule the meeting and/or automatically propose to schedule the meeting at step 610 includes causing the digital personal assistant to automatically schedule the meeting, including causing the digital personal assistant to not invite the designated user to attend the meeting based at least in part on the designated user not having at least one attribute that corresponds to the topic. For instance, causing the digital personal assistant to not invite the designated user to attend the meeting may include causing the digital personal assistant to not include the designated user in a list of invitees to whom an invitation to the meeting is provided.

In another example embodiment, the method of flowchart 600 further includes inferring an importance of the meeting to each of the users. For example, the importance of the meeting to each of the users may be inferred from communication(s) to or from the user regarding the meeting, a frequency of interaction between the user and the other users, a number of interactions between the user and at least one of the other users, an amount of time that the user and at least one of the other users spend together (e.g., working on projects, in a social setting, at work, or in total), a relationship between the user and at least one of the other users, a number of projects that the user has with at least one of the other users, an association of the user with a project to which the meeting pertains, an extent of knowledge that the user has regarding subject matter of the meeting, an amount of time the user spends on subject matter to which the meeting pertains, and/or who proposed the meeting (e.g., whether the user, a manager of the user, a family member of the user, or a friend of the user proposed the meeting). In an example implementation, inference logic 312 infers the importance of the meeting. For instance, inference logic 312 may infer the importance of the meeting based at least in part on the interaction information 822, which may include information regarding any one or more of the example factors mentioned above.

In accordance with this embodiment, causing the digital personal assistant to automatically schedule the meeting and/or automatically propose to schedule the meeting at step 610 includes causing the digital personal assistant to invite a first subset of the users to attend the meeting based at least in part on the importance of the meeting to each user in the first subset reaching a threshold importance and to not invite a second subset of the users to attend the meeting based at least in part on the importance of the meeting to each user in the second subset not reaching the threshold importance. For instance, causing the digital personal assistant to invite the first subset of the users to attend the meeting and to not invite the second subset of the users to attend the meeting may include causing the digital personal assistant to include each user in the first subset in a list of invitees to whom an invitation to the meeting is provided and to not include each user in the second subset in the list.

In yet another example embodiment, the method of flowchart 600 further includes automatically monitoring conversations among the users across multiple types of communication channels. For example, identification logic 808 may automatically monitor the conversations among the users across the types of communication channels. In accordance with this example, identification logic 808 may ambiently monitor the conversations. For instance, identification logic 808 may serve as a third-party observer that does not participate in the conversations. Identification logic 808 may operate in an "always on" (a.k.a. "always listening") state in which identification logic 808 continuously monitors for audio and/or visual inputs, though the scope of the example embodiments is not limited in this respect.

In accordance with this embodiment, identifying the interactions at step 602 includes identifying the interactions that are included in the conversations and that are received via the types of communication channels. For example, a first subset of the interactions may be received via a first type of communication channel. A second subset of the interactions may be received via a second type of communication channel, which is different from the first type, and so on.

In still another example embodiment, the method of flowchart 600 further includes one or more of the steps shown in flowchart 700 of FIG. 7. In accordance with this embodiment, causing the digital personal assistant to automatically schedule the meeting and/or automatically propose to schedule the meeting includes causing the digital personal assistant to automatically schedule the meeting, including causing the digital personal assistant to automatically invite at least a subset of the users to attend the meeting.

As shown in FIG. 7, the method of flowchart 700 begins at step 702. In step 702, a determination is made that user(s) in the subset decline an invitation to the meeting. In an example implementation, determination logic 818 determines that the user(s) in the subset decline the invitation. For instance, determination logic 818 may determine that the user(s) in the subset decline the invitation in response to receipt of invitation information 838. The invitation information 838 may specify that the user(s) in the subset decline the invitation. The invitation information 838 may further specify that one or more other users accept the invitation, though the scope of the example embodiments is not limited in this respect. Determination logic 818 may determine that the user(s) in the subset decline the invitation based at least in part on the invitation specifying that the user(s) in the subset decline the invitation. Determination logic 818 may generate subset information 824 in response to determining that the user(s) in the subset decline the invitation. The subset information 824 may indicate that the user(s) in the subset decline the invitation.

At step 704, an importance of each user in the subset to attend the meeting is inferred. In an example implementation, inference logic 812 infers how important it is for each user in the subset to attend the meeting. For instance, inference logic 812 may infer the importance of each user in the subset to attend the meeting based at least in part on the interaction information 822 and/or the user information 834. Inference logic 812 may generate importance information 828 in response to determining the importance of each user in the subset to attend the meeting. The importance information 812 may specify the importance of each user in the subset to attend the meeting.

At step 706, the digital personal assistant is caused to automatically reschedule the meeting to include each user in the subset who has an importance that is greater than or equal to a threshold importance and to not include each user in the subset who has an importance that is less than the threshold importance. For example, the digital personal assistant may be caused to automatically reschedule the meeting to include each user in the subset who has an importance that is greater than or equal to the threshold importance and to not include each user in the subset who has an importance that is less than the threshold importance in response to inferring the importance of each user in the subset. At least one of the user(s) in the subset who decline the invitation has an importance that is greater than or equal to the threshold importance.

In an example implementation, causation logic 810 causes digital personal assistant 806 to automatically reschedule the meeting to include each user in the subset who has an importance that is greater than or equal to the threshold importance and to not include each user in the subset who has an importance that is less than the threshold importance.

For example, causation logic 810 may cause digital personal assistant 806 to automatically reschedule the meeting as described above in response to receipt of the importance information 828 and/or the subset information 824. In accordance with this example, causation logic 810 may cause digital personal assistant 806 to automatically reschedule the meeting as described above based at least in part on the subset information 824 indicating that the user(s) in the subset decline the invitation.

Causation logic 810 may compare the importance of each user in the subset (e.g., as specified by the importance information 828) to the threshold importance to determine which of the users in the subset have an importance that is greater than or equal to the threshold importance and which of the users in the subset have an importance that is less than the threshold importance.

In an aspect of this embodiment, causing the digital personal assistant to automatically reschedule the meeting includes causing the digital personal assistant to take into consideration a time zone of each user in the subset who has an importance that is greater than or equal to the threshold importance to establish a time at which the meeting is to occur. For instance, store 804 may store time zone information 836. The time zone information 836 may specify a time zone for any one or more of the users. For example, the time zone of each user may be a time zone in which the user works and/or lives. Causation logic 810 may receive (e.g., collect, retrieve) the time zone information 836 from store 804. Causation logic 810 may review the time zone information 836 to determine the time zone of each user in the subset. Causation logic 810 may then cause digital personal assistant 806 to take into consideration the time zone of each user in the subset who has an importance that is greater than or equal to the threshold importance to establish the time at which the meeting is to occur.

It will be recognized that computing system 800 may not include one or more of intent-based scheduling logic 802, store 804, digital personal assistant 806, identification logic 808, causation logic 810, inference logic 812, topic logic 814, selection logic 816, determination logic 818, and/or attribute logic 820. Furthermore, computing system 800 may include components in addition to or in lieu of intent-based scheduling logic 802, store 804, digital personal assistant 806, identification logic 808, causation logic 810, inference logic 812, topic logic 814, selection logic 816, determination logic 818, and/or attribute logic 820.

Figure 9:
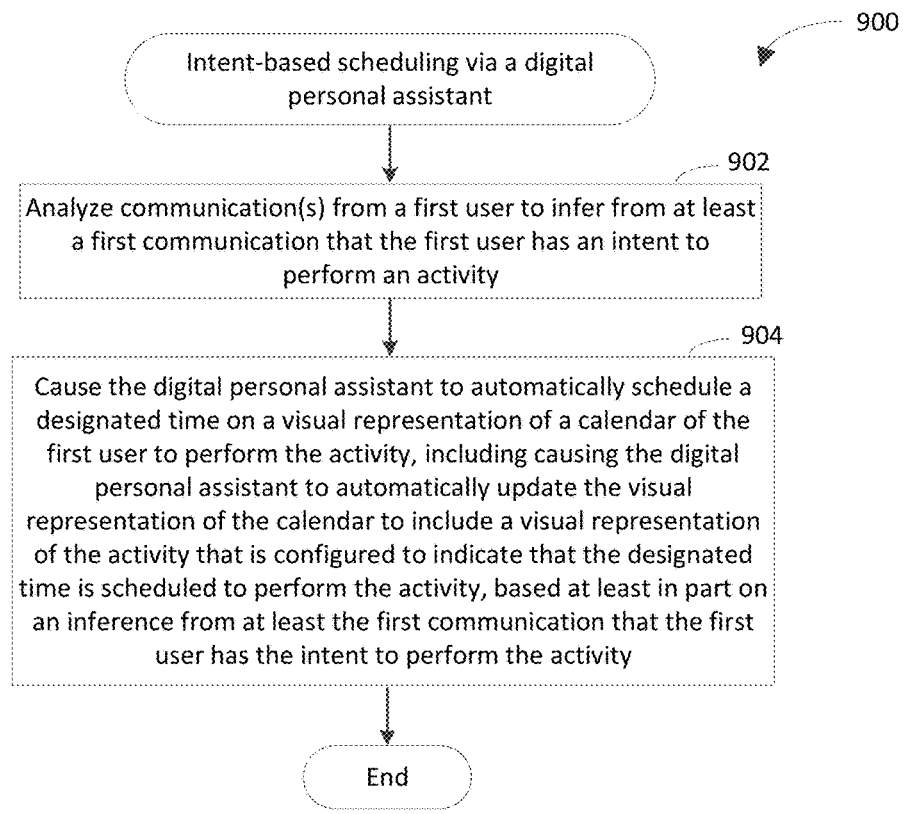
Figure 10:
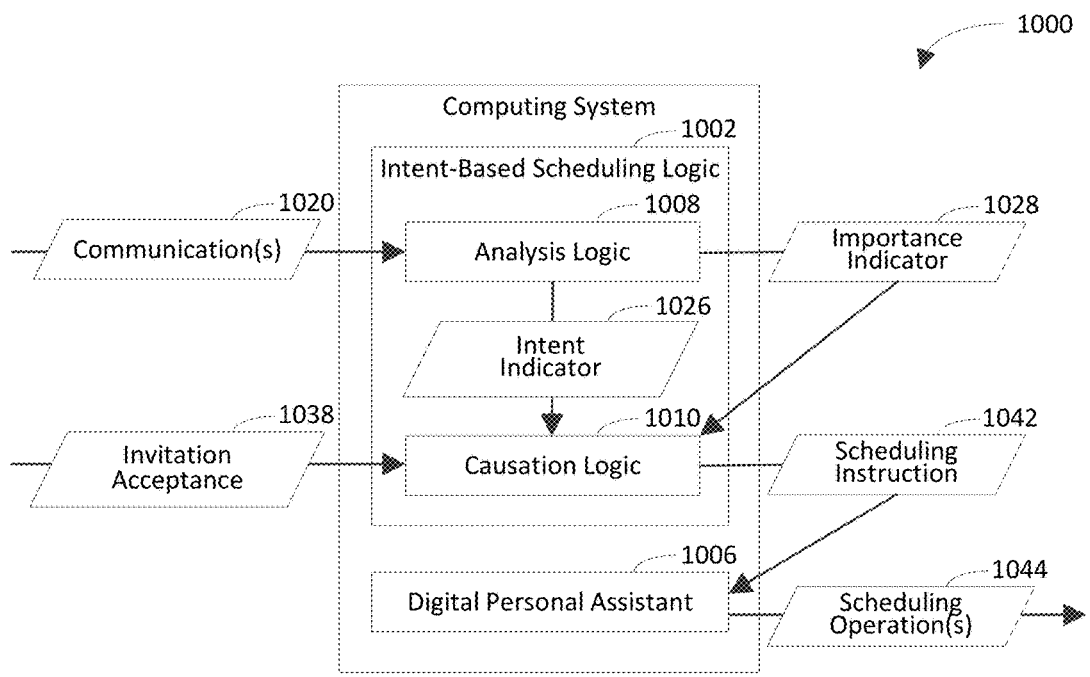

FIG. 9 depicts a flowchart 900 of yet another example method for performing intent-based scheduling via a digital personal assistant in accordance with an embodiment. Flowchart 900 may be performed by intent-based scheduling logic 110 shown in FIG. 1, for example. For illustrative purposes, flowchart 900 is described with respect to computing system 1000 shown in FIG. 10. Computing system 1000 may include one or more of user systems 102A-102M, one or more of server(s) 106A-106N, or any combination thereof, though the scope of the example embodiments is not limited in this respect. Computing system 1000 includes intent-based scheduling logic 1002, which is an example of intent-based scheduling logic 110, according to an embodiment. As shown in FIG. 10, computing system 1000 further includes a digital personal assistant 1006. Intent-based scheduling logic 1002 includes analysis logic 1008 and causation logic 1010. Further structural and operational embodiments will be apparent to persons skilled in the relevant art(s) based on the discussion regarding flowchart 900.

As shown in FIG. 9, the method of flowchart 900 begins at step 902. In step 902, communication(s) from a first user are analyzed to infer (e.g., programmatically infer) from at least a first communication that the first user has an intent to perform an activity. Examples of performing an activity include but are not limited to having a meeting, working on a project, participating in a social event, exercising, and reading. In an example implementation, analysis logic 1008 analyzes communication(s) 1020 from the first user. In accordance with this implementation, the communication(s) 1020 include at least the first communication. Analysis logic 1008 infers from at least the first communication that the first user has the intent to perform the activity. Analysis logic 1008 may generate an intent indicator 1026 in response to inferring that the first user has the intent to perform the activity. The intent indicator specifies that the first user has the intent to perform the activity.

At step 904, the digital personal assistant is caused to automatically schedule a designated time on a visual representation of a calendar of the first user to perform the activity, including causing the digital personal assistant to automatically update the visual representation of the calendar to include a visual representation of the activity that is configured to indicate that the designated time is scheduled to perform the activity, based at least in part on an inference from at least the first communication that the first user has the intent to perform the activity. In an example implementation, causation logic 1010 causes digital personal assistant 1006 to automatically schedule the designated time on the visual representation of the calendar of the first user to perform the activity based at least in part on the inference from at least the first communication that the first user has the intent to perform the activity. In accordance with this implementation, causation logic 1010 causes digital personal assistant 1006 to automatically update the visual representation of the calendar to include the visual representation of the activity based at least in part on the inference from at least the first communication that the first user has the intent to perform the activity.

For example, causation logic 1010 may cause digital personal assistant 1006 to access scheduling functionality of a calendar application that maintains the calendar of the first user. In accordance with this example, causation logic 1010 may cause digital personal assistant 1006 to (a) add the activity on the calendar of the first user (e.g., as an appointment and/or a meeting) using the scheduling functionality and (b) specify that the activity is to occur at the designated time, which may cause the visual representation of the calendar to be automatically updated in accordance with the scheduling functionality to include the visual representation of the activity that is configured to indicate that the designated time is scheduled to perform the activity.

Causation logic 1010 may cause digital personal assistant 1006 to automatically schedule the designated time on the visual representation of the calendar of the first user in any of a variety of ways. For instance, causation logic 1010 may generate a scheduling instruction 1042 in response to the receipt of the intent indicator 1026. The scheduling instruction 1042 instructs digital personal assistant 1006 to perform scheduling operation(s) 1044. The scheduling operation(s) 1044 include automatically scheduling the designated time on the visual representation of the calendar of the first user.

In some example embodiments, one or more steps 902 and/or 904 of flowchart 900 may not be performed. Moreover, steps in addition to or in lieu of steps 902 and/or 904 may be performed. For instance, in an example embodiment, the method of flowchart 900 further includes analyzing communication(s) from a second user to identify an inquiry from the second user as to whether the first person is to perform the activity. In an example implementation, analysis logic 1008 analyzes the communication(s) from the second user to identify the inquiry. For instance, the communication(s) 1020 may include the communication(s) from the second user. In accordance with this embodiment, the first user having the intent to perform the activity is inferred from at least the first communication in response to the inquiry being identified.

In another example embodiment, an importance of the activity is inferred from at least one of the communication(s). It will be recognized that the importance of the activity may be inferred from factor(s) in addition to or in lieu of at least one of the communication(s). For instance, the importance of the activity may be inferred at least in part from an amount of time the user spends on subject matter with which the activity relates. In one example, analysis logic 1008 may infer the importance of the activity from communication(s) 1020. In accordance with this example, analysis logic may generate an importance indicator 1028 in response to inferring the importance of the activity. The importance indicator 1028 may specify the importance of the activity.

In a first aspect of this embodiment, causing the digital personal assistant to automatically schedule the designated time on the visual representation of the calendar of the first user includes automatically rescheduling a second activity that is represented on the calendar to accommodate the activity based at least in part on the importance of the activity that is inferred from at least one of the communication(s) being greater than an importance of the second activity. For example, a visual representation of the second activity may be moved in the visual representation of the calendar to a time that is different from the designated time. In accordance with this example, the visual representation of the second activity may be moved so that the visual representation of the second activity does not overlap a visual representation of the activity, which is configured to indicate that the designated time is scheduled to perform the activity.

In a second aspect of this embodiment, causing the digital personal assistant to automatically schedule the designated time on the visual representation of the calendar of the first user includes automatically reducing a duration of a second activity that is represented on the calendar to accommodate the activity based at least in part on the importance of the activity that is inferred from at least one of the communication(s) being greater than an importance of the second activity. For example, a size of a visual representation of the second activity may be reduced in the visual representation of the calendar to indicate that the duration of the second activity is reduced. In accordance with this example, the size of the visual representation of the second activity may be reduced by reducing a number of time increments that the visual representation of the second activity covers in the calendar to correspond to the reduced duration of the second activity.

In a third aspect of this embodiment, causing the digital personal assistant to automatically schedule the designated time on the visual representation of the calendar of the first user includes automatically cancelling a second activity to accommodate the activity based at least in part on the importance of the activity that is inferred from at least one of the communication(s) being greater than an importance of the second activity. For example, a visual representation of the second activity may be removed from the visual representation of the calendar (e.g., to indicate that the second activity is cancelled). In another example, an opacity of the visual representation of the second activity may be reduced to indicate that the second activity is cancelled. In yet another example, the visual representation of the second activity is marked in a way that indicates that the second activity is cancelled.

In yet another example embodiment, causing the digital personal assistant to automatically schedule the designated time includes causing the digital personal assistant to automatically configure the visual representation of the calendar of the first user, which is configured for viewing by at least one second user that is different from the first user, to indicate that availability of the first user at the designated time is tentative.

In an aspect of this embodiment, causing the digital personal assistant to automatically schedule the designated time further includes causing the digital personal assistant to automatically configure a second visual representation of the calendar of the first user, which is configured for viewing by the first user, to indicate that the availability of the first user at the designated time is free. In accordance with this aspect, the method of flowchart 900 may further include receiving an acceptance of an invitation to perform the activity at the designated time from the first user in response to causing the digital personal assistant to automatically schedule the designated time on the visual representation of the calendar to perform the activity. For instance, causation logic 1010 may receive an invitation acceptance 1038 from the first user. The invitation acceptance 1038 may indicate acceptance of the invitation to perform the activity at the designated time.

In a first example of this aspect, the method of flowchart 900 further includes causing the digital personal assistant to reconfigure the second visual representation of the calendar of the first user to change an indication of the availability of the first user at the designated time in the second visual representation from free to booked in response to receiving the acceptance of the invitation. In a second example of this aspect, the method of flowchart 900 further includes causing the digital personal assistant to reconfigure the visual representation of the calendar of the first user, which is for viewing by the at least one second user, to change an indication of the availability of the first user at the designated time in the visual representation from tentative to booked in response to receiving the acceptance of the invitation.

In still another example embodiment, causing the digital personal assistant to automatically schedule the designated time includes causing the digital personal assistant to automatically configure the visual representation of the calendar of the first user, which is configured for viewing by the first user and not for viewing by second user(s), to indicate that availability of the first user at the designated time is tentative or booked. In accordance with this embodiment, causing the digital personal assistant to automatically schedule the designated time further includes causing the digital personal assistant to automatically configure a second visual representation of the calendar of the first user, which is configured for viewing by the second user(s), to indicate that the availability of the first user at the designated time is free.

In an aspect of this embodiment, the method of flowchart 900 further includes receiving an acceptance of an invitation to perform the activity at the designated time from the first user in response to causing the digital personal assistant to automatically schedule the designated time on the visual representation of the calendar to perform the activity. For instance, causation logic 1010 may receive the invitation acceptance 1038 from the first user. The invitation acceptance 1038 may indicate acceptance of the invitation to perform the activity at the designated time.

In a first example of this aspect, the method of flowchart 900 further includes causing the digital personal assistant to reconfigure the second visual representation of the calendar of the first user to change an indication of the availability of the first user at the designated time in the second visual representation from free to booked in response to receiving the acceptance of the invitation. In a second example of this aspect, the method of flowchart 900 further includes causing the digital personal assistant to reconfigure the visual representation of the calendar of the first user, which is configured for viewing by the first user and not for viewing by the second user(s), to change an indication of the availability of the first user at the designated time in the visual representation from tentative to booked in response to receiving the acceptance of the invitation.

In another example embodiment, the method of flowchart 900 further includes automatically monitoring conversations between the first user and other user(s) across multiple types of communication channels. In an example implementation, analysis logic 1008 monitors the conversations between the first user and the other user(s) across the types of communication channels. For instance, the communication(s) 1020 may include the conversations.

It will be recognized that computing system 1000 may not include one or more of intent-based scheduling logic 1002, digital personal assistant 1006, analysis logic 1008, and/or causation logic 1010. Furthermore, computing system 1000 may include components in addition to or in lieu of intent-based scheduling logic 1002, digital personal assistant 1006, analysis logic 1008, and/or causation logic 1010.

Figure 11:
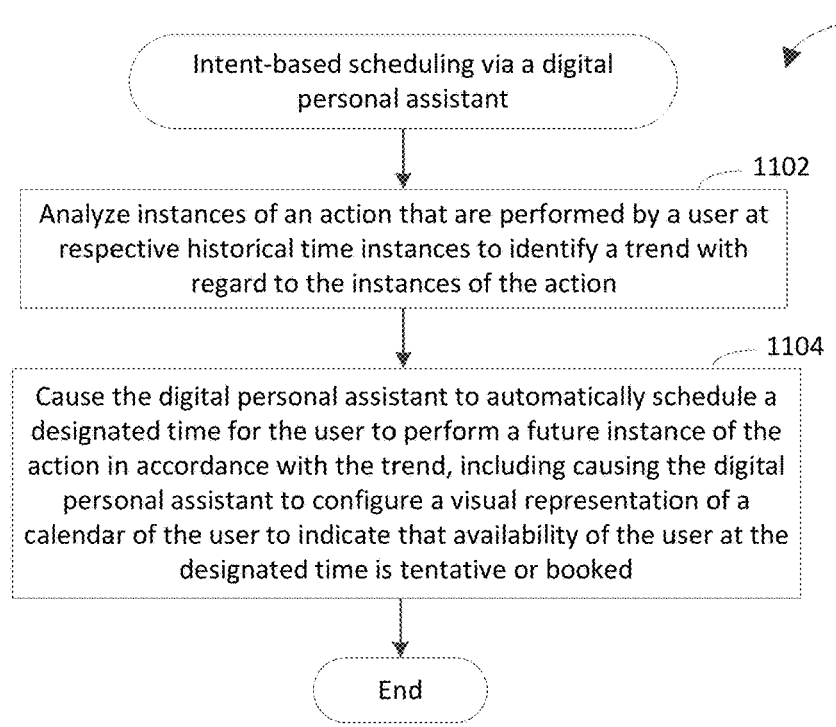
Figure 12:
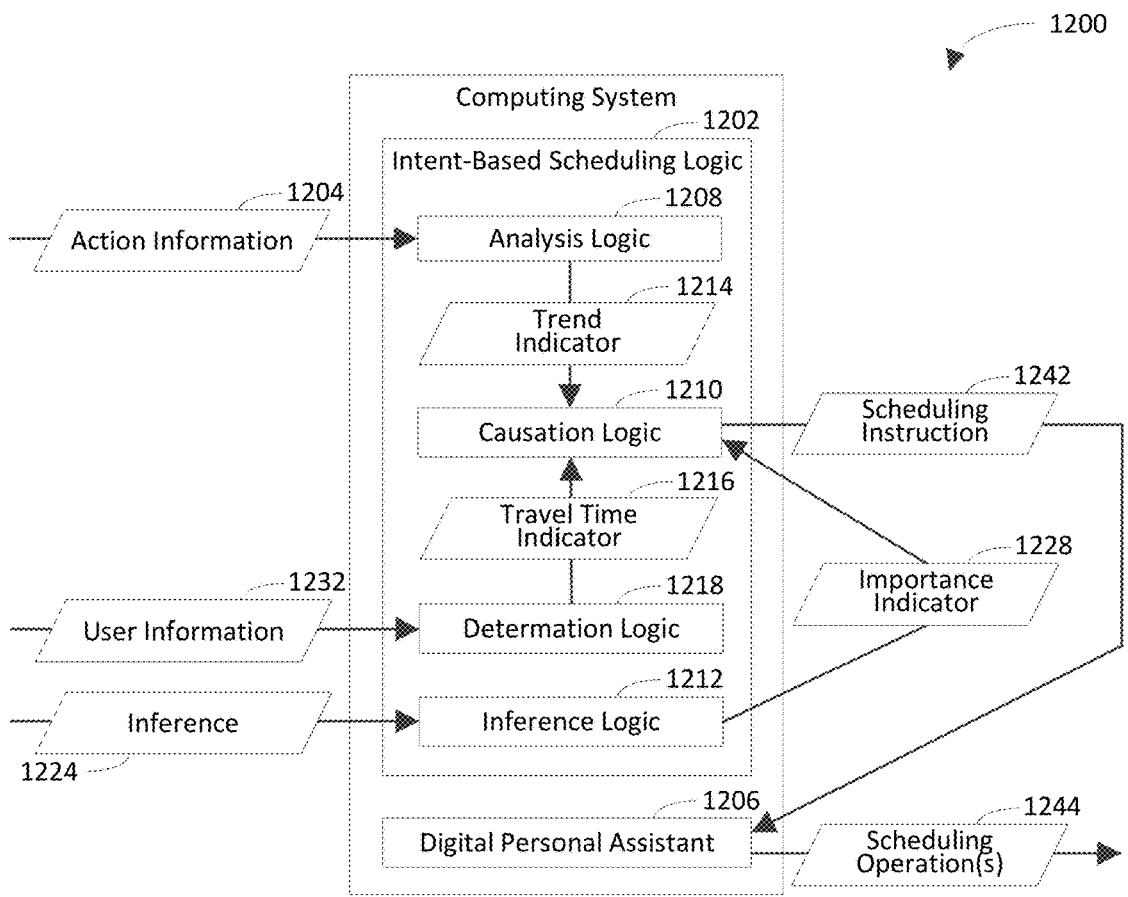

FIG. 11 depicts a flowchart 1100 of still another example method for performing intent-based scheduling via a digital personal assistant in accordance with an embodiment. Flowchart 1100 may be performed by intent-based scheduling logic 110 shown in FIG. 1, for example. For illustrative purposes, flowchart 1100 is described with respect to computing system 1200 shown in FIG. 12. Computing system 1200 may include one or more of user systems 102A-102M, one or more of server(s) 106A-106N, or any combination thereof, though the scope of the example embodiments is not limited in this respect. Computing system 1200 includes intent-based scheduling logic 1202, which is an example of intent-based scheduling logic 110, according to an embodiment. As shown in FIG. 12, computing system 1200 further includes a digital personal assistant 1206. Intent-based scheduling logic 1202 includes analysis logic 1208, causation logic 1210, inference logic 1212, and determination logic 1218. Further structural and operational embodiments will be apparent to persons skilled in the relevant art(s) based on the discussion regarding flowchart 1100.

As shown in FIG. 11, the method of flowchart 1100 begins at step 1102. In step 1102, instances of an action that are performed by a user at respective historical time instances are analyzed to identify a trend with regard to the instances of the action. In an example implementation, analysis logic 1208 analyzes the instances of the action to identify the trend. For example, action information 1204 may include information regarding the instances of the action that are performed by the user at the respective historical instances. In accordance with this example, the action information 1204 may serve as a log for a variety of actions. Accordingly, action information 1204 may include an entry for each instance of each action that is performed. The action information 1204 may also specify which of a variety of users performed each instance of each action. Analysis logic 1208 may review the action information 1204 to determine (e.g., identify) the instances of the action that are performed by the user at the respective historical time instances. Analysis 1208 may analyze the instances of the action that are performed by the user at the respective historical time instances to identify the trend in response to determining the instances from the action information 1204. Analysis logic 1208 may generate a trend indicator 1214 in response to identifying the trend. The trend indicator 1214 may indicate the trend. For instance, the trend indicator may specify one or more attributes of the trend. Examples of an attribute of the trend include but are not limited to a shape (e.g., slope) of the trend, a number of instances on which the trend is based, the action with which the trend corresponds, and the user with whom the trend corresponds.

At step 1104, the digital personal assistant is caused to automatically schedule a designated time for the user to perform a future instance of the action in accordance with the trend, including causing the digital personal assistant to configure a visual representation of a calendar of the user to indicate that availability of the user at the designated time is tentative or booked. In an example implementation, causation logic 1210 causes digital personal assistant 1206 to automatically schedule the designated time for the user to perform the future instance of the action in accordance with the trend. Causation logic 1210 may cause digital personal assistant 1206 to automatically schedule the designated time in response to receipt of the trend indicator 1214. For example, causation logic 1210 may cause digital personal assistant 1206 to automatically schedule the designated time based at least in part on the trend indicator 1214 indicating the trend. In accordance with this example, causation logic 1210 may analyze the trend that is indicated by the trend indicator 1214 to determine the future instance of the action that is to be performed by the user. For instance, causation logic 1210 may use an extrapolation technique with regard to the instances of the action, which are analyzed at step 1102 to determine the trend, in order to determine the future instance of the action that is to be performed by the user. In accordance with this implementation, causation logic 1210 causes digital personal assistant 1206 to configure the visual representation of the calendar of the user to indicate that the availability of the user at the designated time is tentative or booked.

Causation logic 1210 may cause digital personal assistant 1206 to automatically schedule the designated time for the user to perform the future instance of the action in any of a variety of ways. For instance, causation logic 1210 may generate a scheduling instruction 1242 in response to the receipt of the trend indicator 1214. The scheduling instruction 1242 instructs digital personal assistant 1206 to perform scheduling operation(s) 1244. The scheduling operation(s) 1244 include automatically scheduling the designated time for the user to perform the future instance of the action.

In some example embodiments, one or more steps 1102 and/or 1104 of flowchart 1100 may not be performed. Moreover, steps in addition to or in lieu of steps 1102 and/or 1104 may be performed. For instance, in an example embodiment, the method of flowchart 1100 further includes determining an amount of travel time that the user is statistically likely to experience during travel to a location at which the future instance of the action is to be performed. For example, determination logic 1218 may determine the amount of travel time that the user is statistically likely to experience during travel to the location. In accordance with this example, user information 1232 may include information pertaining to travel times of the user. For instance, the user information 1232 may include historical information that indicates an amount of travel time that the user previously experienced during travel from specified source(s) to specified destination(s). The historical information may indicate an amount of travel time that the user experienced during historical travels to the location at which the instance of the action is to be performed. The historical information may indicate multiple amounts of time corresponding to the multiple respective historical travels, an average travel time for the historical travels, and/or a median travel time for the historical travels. The user information 1232 may include other information that may affect the amount of time (e.g., anticipated traffic congestion at the designated time, anticipated weather at the designated time, and/or travel times experienced by other users during travel to the location). In further accordance with this example, determination logic 1218 may perform a statistical analysis with regard to the user information 1232 to determine the amount of travel time that the user is statistically likely to experience during travel to the location. Determination logic 1218 may generate a travel time indicator 1216 in response to determining the amount of travel time that the user is statistically likely to experience during travel to the location. The travel time indicator 1216 specifies the amount of travel time that the user is statistically likely to experience during travel to the location.

In accordance with this embodiment, the method of flowchart 1100 further includes causing the digital personal assistant to configure the visual representation of the calendar of the user to indicate the amount of travel time. For example, causation logic 1210 may cause digital personal assistant 1206 to configure the visual representation of the calendar of the user to indicate the amount of travel time. In accordance with this example, causation logic 1210 may cause digital personal assistant 1206 to configure the visual representation of the calendar of the user in response to receipt of the travel time indicator 1216. For instance, causation logic 1210 may cause digital personal assistant 1206 to configure the visual representation of the calendar of the user to indicate the amount of travel time based at least in part on the travel time indicator 1216 specifying the amount of travel time.

In accordance with this example, causation logic 1210 may cause digital personal assistant 1206 to access scheduling functionality of a calendar application that maintains the calendar of the user. For instance, causation logic 1210 may cause digital personal assistant 1206 to add a visual representation of the travel time (e.g., as an appointment and/or a meeting) in the visual representation of the calendar using the scheduling functionality and/or increase a size of a visual representation of the future instance of the activity in the visual representation of the calendar, for example, by increasing a number of time increments that the visual representation of the future instance of the activity covers in the calendar to account for the travel time.

In another example embodiment, the method of flowchart 1100 further includes inferring an importance of the future instance of the action. For example, inference logic 1212 may infer the importance of the future instance of the action. In accordance with this example, inference logic 1212 may discover the importance of the future instance of the action based on an inference 1224, which indicates the importance. Inference logic 1212 may infer the importance of the future instance from communications regarding the action, though the scope of the example embodiments is not limited in this respect. Inference logic 1212 may generate an importance indicator 1228 in response to inferring the importance. The importance indicator 1228 may specify the importance of the future instance of the action.

In a first aspect of this embodiment, causing the digital personal assistant to automatically schedule the designated time for the user to perform the future instance of the action includes automatically reducing an amount of time allocated to a previously scheduled activity to accommodate the future instance of the action based at least in part on an inference that the importance of the future instance of the action is greater than an importance of the previously scheduled activity. In accordance with this aspect, automatically reducing the amount of time allocated to the previously scheduled activity may include automatically changing a representation of the previously scheduled activity on the visual representation of the calendar to indicate that the amount of time allocated to the previously scheduled activity is reduced.

In a second aspect of this embodiment, causing the digital personal assistant to automatically schedule the designated time for the user to perform the future instance of the action includes automatically cancelling a previously scheduled activity to accommodate the future instance of the action based at least in part on an inference that the importance of the future instance of the action is greater than an importance of the previously scheduled activity. In accordance with this aspect, automatically cancelling a previously scheduled activity to accommodate the future instance of the action may include automatically deleting a representation of the previously scheduled activity from the visual representation of the calendar to indicate that the previously scheduled activity is cancelled.

In a third aspect of this embodiment, causing the digital personal assistant to automatically schedule the designated time for the user to perform the future instance of the action includes causing the digital personal assistant to automatically reschedule and/or automatically propose to reschedule a previously scheduled activity to accommodate the future instance of the action based at least in part on an inference that the importance of the future instance of the action is greater than an importance of the previously scheduled activity.

In an example of this aspect, causing the digital personal assistant to automatically reschedule and/or automatically propose to reschedule the previously scheduled activity includes causing the digital personal assistant to automatically reschedule the previously scheduled activity to accommodate the future instance of the action. In accordance with this example, causing the digital personal assistant to automatically reschedule the previously scheduled activity to accommodate the future instance of the action may include one or more of the steps shown in flowchart 1300 of FIG. 13. Flowchart 1300 may be performed by causation logic 1210 shown in FIG. 12, for example. For illustrative purposes, flowchart 400 is described with respect to causation logic 500 of FIG. 5, which is an example of causation logic 1210, according to an embodiment. Further structural and operational embodiments will be apparent to persons skilled in the relevant art(s) based on the discussion regarding flowchart 1300.

Before discussing flowchart 1300, it should be mentioned that computing system 1200 may not include one or more of intent-based scheduling logic 1202, digital personal assistant 1206, analysis logic 1208, causation logic 1210, inference logic 1212, and/or determination logic 1218. Furthermore, computing system 1200 may include components in addition to or in lieu of intent-based scheduling logic 1202, digital personal assistant 1206, analysis logic 1208, causation logic 1210, inference logic 1212, and/or determination logic 1218.

Figure 13:
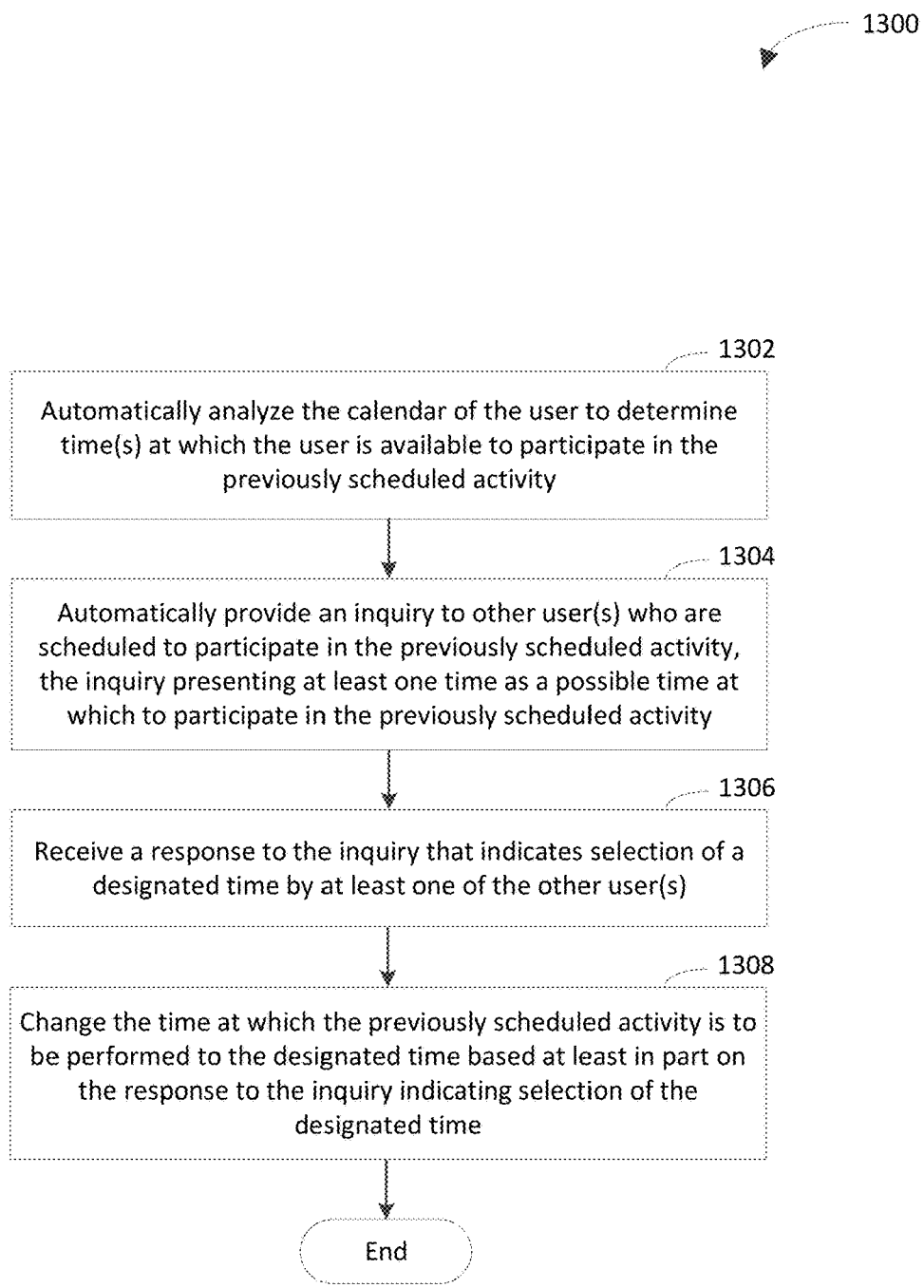
FIG. 13 depicts a flowchart of an example method for causing a digital personal assistant to automatically reschedule a previously scheduled activity in accordance with an embodiment.

As shown in FIG. 13, the method of flowchart 1300 begins at step 1302. In step 1302, the calendar of the user is automatically analyzed to determine time(s) at which the user is available to participate in the previously scheduled activity. In an example implementation, calendar analyzer 502 automatically analyzes the calendar of the user to determine the time(s) at which the user is available to participate in the previously scheduled activity. In accordance with this implementation, calendar analyzer 502 may generate a time indicator 512 in response to determining the time(s) at which the user is available to participate in the previously scheduled activity. The time indicator 512 specifies the time(s) at which the user is available to participate in the previously scheduled activity.

At step 1304, an inquiry is automatically provided to other user(s) who are scheduled to participate in the previously scheduled activity. The inquiry presents at least one time as a possible time at which to participate in the previously scheduled activity. In an example implementation, inquiry provider 504 automatically provides an inquiry 514 to the other user(s) who are scheduled to participate in the previously scheduled activity. The inquiry 514 presents at least one time as a possible time at which to participate in the previously scheduled activity.

At step 1306, a response to the inquiry is received that indicates selection of a designated time by at least one of the other user(s). In an example implementation, time changer 506 receives a response 510 to the inquiry 514 that indicates selection of the designated time by at least one of the other user(s).

At step 1308, the time at which the previously scheduled activity is to be performed is changed to the designated time based at least in part on the response to the inquiry indicating selection of the designated time. In an example implementation, time changer 506 changes the time at which the previously scheduled activity is to be performed to the designated time based at least in part on the response 510 to the inquiry 514 indicating selection of the designated time.

Example illustrations of some of the example techniques described herein will not be described. In a first example illustration, a man is talking with his family in their living room. The man may say, "Hey, we should really go watch that movie tomorrow." In response, the man's wife may say, "Great, we should do that. What time are they playing?" A digital personal assistant may automatically insert the show times on the man's calendar and/or the woman's calendar and say, "I have some show times for you."

In a second example illustration, a first person says to a second person, "Hey, can you update this item." The second person may say, "Yeah, I'll updated it and send it to you today." A digital personal assistant may automatically offer to block some time on the second person's calendar for updating the item. For instance, the digital personal assistant may say, "Hey, you have an hour free" or "You are busy this afternoon, but you have an hour free now; you might want to just do it now."

In one aspect of this illustration, the digital personal assistant may reschedule or shorten a duration allotted for a team meeting that the second user is scheduled to attend in order to accommodate the second user's updating the item. The digital personal assistant may determine that updating the item is more critical than the team meeting and therefore may send a notification to the members of the team to inform them that the team meeting has been rescheduled or shortened. The digital personal assistant may determine that the team meeting was set up through email. The digital personal assistant may therefore choose to send the notification to the members through email.

In another aspect of this illustration, the digital personal assistant may automatically determine alternative times at which the second user is available and send an inquiry to the members of the team to ask whether any of the alternative times are acceptable, considering that the team meeting needs to be rescheduled. The digital personal assistant may automatically reschedule the team meeting upon receiving responses regarding the alternative times from the members of the team.

Any one or more of intent-based scheduling logic 110, intent-based scheduling logic 302, analysis logic 308, causation logic 310, inference logic 312, topic logic 314, identification logic 316, determination logic 318, causation logic 500, calendar analyzer 502, inquiry provider 504, time changer 506, intent-based scheduling logic 802, identification logic 808, causation logic 810, inference logic 812, topic logic 814, selection logic 816, determination logic 818, attribute logic 820, intent-based scheduling logic 1002, analysis logic 1008, causation logic 1010, intent-based scheduling logic 1202, analysis logic 1208, causation logic 1210, inference logic 1212, determination logic 1218, flowchart 200, flowchart 400, flowchart 600, flowchart 700, flowchart 900, flowchart 1100, and/or flowchart 1300 may be implemented in hardware, software, firmware, or any combination thereof.

For example, any one or more of intent-based scheduling logic 110, intent-based scheduling logic 302, analysis logic 308, causation logic 310, inference logic 312, topic logic 314, identification logic 316, determination logic 318, causation logic 500, calendar analyzer 502, inquiry provider 504, time changer 506, intent-based scheduling logic 802, identification logic 808, causation logic 810, inference logic 812, topic logic 814, selection logic 816, determination logic 818, attribute logic 820, intent-based scheduling logic 1002, analysis logic 1008, causation logic 1010, intent-based scheduling logic 1202, analysis logic 1208, causation logic 1210, inference logic 1212, determination logic 1218, flowchart 200, flowchart 400, flowchart 600, flowchart 700, flowchart 900, flowchart 1100, and/or flowchart 1300 may be implemented, at least in part, as computer program code configured to be executed in one or more processors.

In another example, any one or more of intent-based scheduling logic 110, intent-based scheduling logic 302, analysis logic 308, causation logic 310, inference logic 312, topic logic 314, identification logic 316, determination logic 318, causation logic 500, calendar analyzer 502, inquiry provider 504, time changer 506, intent-based scheduling logic 802, identification logic 808, causation logic 810, inference logic 812, topic logic 814, selection logic 816, determination logic 818, attribute logic 820, intent-based scheduling logic 1002, analysis logic 1008, causation logic 1010, intent-based scheduling logic 1202, analysis logic 1208, causation logic 1210, inference logic 1212, determination logic 1218, flowchart 200, flowchart 400, flowchart 600, flowchart 700, flowchart 900, flowchart 1100, and/or flowchart 1300 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Further Discussion of Some Example Embodiments

A first example system to perform intent-based scheduling via a digital personal assistant comprises analysis logic configured to analyze one or more communications from a first user to identify a first communication from the first user that indicates that the first user has an intent to have a first meeting between at least the first user and one or more second users. The analysis logic is further configured to analyze one or more communications from the one or more second users to identify one or more second communications from the one or more second users that are in response to the first communication and that indicate that the one or more second users have the intent to have the first meeting. The first example system further comprises causation logic configured to cause the digital personal assistant to at least one of automatically propose or automatically schedule a time to have the first meeting between at least the first user and the one or more second users based at least in part on the first communication and the one or more second communications indicating that the first user and the one or more second users have the intent to have the first meeting.

In a first aspect of the first example system, the first example system further comprises inference logic configured to infer an importance of the first meeting. In accordance with the first aspect, the causation logic is configured to cause the digital personal assistant to at least one of automatically reschedule or automatically propose to reschedule a second meeting to accommodate the first meeting based at least in part on an inference that the importance of the first meeting is greater than an importance of the second meeting.

In an example of the first aspect of the first example system, the causation logic is configured to cause the digital personal assistant to automatically reschedule the second meeting to accommodate the first meeting. In accordance with this example, the causation logic comprises a calendar analyzer configured to automatically analyze at least one calendar of at least one respective second user of the one or more second users to determine one or more times at which the at least one second user is available to have the second meeting. In further accordance with this example, the causation logic further comprises an inquiry provider configured to automatically provide an inquiry to one or more specified users who are scheduled to attend the second meeting. The inquiry presents at least one time from the one or more times as a possible time at which to conduct the second meeting. In further accordance with this example, the causation logic further comprises a time changer configured to change the time at which the second meeting is to be conducted to a designated time, which is selected from the at least one time by at least one of the one or more users who are scheduled to attend the second meeting, based at least in part on a response to the inquiry indicating selection of the designated time.

In a second aspect of the first example system, the first example system further comprises inference logic configured to infer an importance of the first meeting. In accordance with the second aspect, the causation logic is configured to cause the digital personal assistant to automatically reduce a duration of a second meeting to accommodate the first meeting based at least in part on an inference that the importance of the first meeting is greater than an importance of the second meeting. The second aspect of the first example system may be implemented in combination with the first aspect of the first example system, though the example embodiments are not limited in this respect.

In a third aspect of the first example system, the first example system further comprises inference logic configured to infer an importance of the first meeting. In accordance with the third aspect, the causation logic is configured to cause the digital personal assistant to automatically cancel a second meeting to accommodate the first meeting based at least in part on an inference that the importance of the first meeting is greater than an importance of the second meeting. The third aspect of the first example system may be implemented in combination with the first and/or second aspect of the first example system, though the example embodiments are not limited in this respect.

In a fourth aspect of the first example system, the first example system further comprises topic logic configured to determine a topic of the first meeting. In accordance with the fourth aspect, the first example system further comprises identification logic configured to identify a third user who has an attribute that corresponds to the topic. In further accordance with the fourth aspect, the causation logic is configured to cause the digital personal assistant to suggest that the third user be invited to the first meeting based at least in part on the third user having the attribute that corresponds to the topic. The fourth aspect of the first example system may be implemented in combination with the first, second, and/or third aspect of the first example system, though the example embodiments are not limited in this respect.

In a fifth aspect of the first example system, the first example system further comprises inference logic configured to infer that a document is relevant to the first meeting. In accordance with the fifth aspect, the causation logic is configured to cause the digital personal assistant to attach the document to a calendar entry that represents the first meeting based at least in part on an inference that the document is relevant to the first meeting. The fifth aspect of the first example system may be implemented in combination with the first, second, third, and/or fourth aspect of the first example system, though the example embodiments are not limited in this respect.

In a sixth aspect of the first example system, the first example system further comprises inference logic configured to infer a title of the first meeting from at least one of (a) at least one of the one or more communications from the first user or (b) at least one of the one or more communications from the one or more second users. The sixth aspect of the first example system may be implemented in combination with the first, second, third, fourth, and/or fifth aspect of the first example system, though the example embodiments are not limited in this respect.

In a seventh aspect of the first example system, the first example system further comprises inference logic configured to infer an agenda of the first meeting from at least one of (a) at least one of the one or more communications from the first user or (b) at least one of the one or more communications from the one or more second users. The seventh aspect of the first example system may be implemented in combination with the first, second, third, fourth, fifth, and/or sixth aspect of the first example system, though the example embodiments are not limited in this respect.

In an eighth aspect of the first example system, the analysis logic is configured to automatically generate notes from communications among at least the first user and the one or more second users that occur during the meeting. In accordance with the eighth aspect, the causation logic is configured to cause the digital personal assistant to provide the notes to at least one of (a) the first user or (b) at least one second user of the one or more second users in response to automatically generating the notes. The eighth aspect of the first example system may be implemented in combination with the first, second, third, fourth, fifth, sixth, and/or seventh aspect of the first example system, though the example embodiments are not limited in this respect.

In a ninth aspect of the first example system, the first example system further comprises determination logic configured to determine that an amount of information that is to be discussed during the first meeting is not capable of being discussed within an amount of time that is allocated for the first meeting. In accordance with the ninth aspect, the causation logic is configured to cause the digital personal assistant to automatically schedule a follow-up meeting for discussion of the information that is not discussed during the first meeting. The ninth aspect of the first example system may be implemented in combination with the first, second, third, fourth, fifth, sixth, seventh, and/or eighth aspect of the first example system, though the example embodiments are not limited in this respect.

In a tenth aspect of the first example system, the causation logic is configured to cause the digital personal assistant to automatically schedule the time to have the first meeting. The causation logic is configured to cause the digital personal assistant to automatically configure a visual representation of one or more calendars of the one or more respective second users to indicate that attendance of the one or more second users at the meeting is tentative. The tenth aspect of the first example system may be implemented in combination with the first, second, third, fourth, fifth, sixth, seventh, eighth, and/or ninth aspect of the first example system, though the example embodiments are not limited in this respect.

In an eleventh aspect of the first example system, the analysis logic is configured to automatically monitor conversations between the first user and one or more other users across a plurality of types of communication channels. In accordance with the eleventh aspect, the one or more communications from the first user include a plurality of communications that are from the conversations and that are received via the plurality of types of communication channels. The eleventh aspect of the first example system may be implemented in combination with the first, second, third, fourth, fifth, sixth, seventh, eighth, ninth, and/or tenth aspect of the first example system, though the example embodiments are not limited in this respect.

A second example system to perform intent-based scheduling via a digital personal assistant comprises identification logic configured to identify interactions among a plurality of users, the identification logic further configured to identify tools that are used to facilitate the interactions. The second example system further comprises inference logic configured to infer an intent to have a meeting between the plurality of users. The second example system further comprises selection logic configured to automatically select a designated tool from the tools to establish communication for the meeting based at least in part on the designated tool being used more than other tools to facilitate the interactions. The second example system further comprises causation logic configured to cause the digital personal assistant to at least one of automatically schedule the meeting or automatically propose to schedule the meeting based at least in part on an inference of the intent to have the meeting.

In a first aspect of the second example system, the inference logic is configured to infer the intent to have the meeting from a plurality of communications among at least some of the plurality of users.

In a second aspect of the second example system, the second example system further comprises topic logic configured to determine a topic of the meeting. In accordance with the second aspect, the second example system further comprises attribute logic configured to determine that at least one attribute of a designated user that is included in the plurality of users corresponds to the topic. In further accordance with the second aspect, the causation logic is configured to cause the digital personal assistant to automatically schedule the meeting, the causation logic configured to cause the digital personal assistant to automatically specify that attendance of the designated user at the meeting is required based at least in part on the at least one attribute of the designated user corresponding to the topic. The second aspect of the second example system may be implemented in combination with the first aspect of the second example system, though the example embodiments are not limited in this respect.

In a third aspect of the second example system, the second example system further comprises topic logic configured to determine a topic of the meeting. In accordance with the third aspect, the second example system further comprises attribute logic configured to determine that a designated user does not have at least one attribute that corresponds to the topic, the designated user included in the plurality of users. In further accordance with the third aspect, the causation logic is configured to cause the digital personal assistant to automatically schedule the meeting, the causation logic configured to case the digital personal assistant to automatically specify that attendance of the designated user at the meeting is optional based at least in part on the designated user not having at least one attribute that corresponds to the topic. The third aspect of the second example system may be implemented in combination with the first and/or second aspect of the second example system, though the example embodiments are not limited in this respect.

In a fourth aspect of the second example system, the second example system further comprises topic logic configured to determine a topic of the meeting. In accordance with the fourth aspect, the second example system further comprises attribute logic configured to determine that a designated user does not have at least one attribute that corresponds to the topic, the designated user included in the plurality of users. In further accordance with the fourth aspect, the causation logic is configured to cause the digital personal assistant to automatically schedule the meeting, the causation logic configured to cause the digital personal assistant to not invite the designated user to attend the meeting based at least in part on the designated user not having at least one attribute that corresponds to the topic. The fourth aspect of the second example system may be implemented in combination with the first, second, and/or third aspect of the second example system, though the example embodiments are not limited in this respect.

In a fifth aspect of the second example system, the causation logic is configured to cause the digital personal assistant to automatically schedule the meeting, the causation logic configured to cause the digital personal assistant to automatically invite at least a subset of the plurality of users to attend the meeting. In accordance with the fifth aspect, the second example system further comprises determination logic configured to determine that one or more users in the subset decline an invitation to the meeting. In further accordance with the fifth aspect, the inference logic is configured to infer an importance of each user in the subset to attend the meeting. In further accordance with the fifth aspect, the causation logic is configured to cause the digital personal assistant to automatically reschedule the meeting to include each user in the subset who has an importance that is greater than or equal to a threshold importance and to not include each user in the subset who has an importance that is less than the threshold importance in response to inferring the importance of each user in the subset, at least one of the one or more users in the subset who decline the invitation having an importance that is greater than or equal to the threshold importance. The fifth aspect of the second example system may be implemented in combination with the first, second, third, and/or fourth aspect of the second example system, though the example embodiments are not limited in this respect.

In an example of the fifth aspect of the second example system, the causation logic is configured to cause the digital personal assistant to take into consideration a time zone of each user in the subset who has an importance that is greater than or equal to the threshold importance to establish a time at which the meeting is to occur.

In a sixth aspect of the second example system, the inference logic is configured to infer an importance of the meeting to each of the plurality of users. In accordance with the sixth aspect, the causation logic is configured to cause the digital personal assistant to invite a first subset of the plurality of users to attend the meeting based at least in part on the importance of the meeting to each user in the first subset reaching a threshold importance and to not invite a second subset of the plurality of users to attend the meeting based at least in part on the importance of the meeting to each user in the second subset not reaching the threshold importance. The sixth aspect of the second example system may be implemented in combination with the first, second, third, fourth, and/or fifth aspect of the second example system, though the example embodiments are not limited in this respect.

In a seventh aspect of the second example system, the identification logic is configured to automatically monitor conversations among the plurality of users across a plurality of types of communication channels. In accordance with the seventh aspect, the conversations include the interactions, which are received via the plurality of types of communication channels. The seventh aspect of the second example system may be implemented in combination with the first, second, third, fourth, fifth, and/or sixth aspect of the second example system, though the example embodiments are not limited in this respect.

A third example system to perform intent-based scheduling via a digital personal assistant comprises analysis logic configured to analyze one or more communications from a first user to infer from at least a first communication of the one or more communications that the first user has an intent to perform an activity. The third example system further comprises causation logic configured to cause the digital personal assistant to automatically schedule a designated time on a visual representation of a calendar of the first user to perform the activity by automatically updating the visual representation of the calendar to include a visual representation of the activity that is configured to indicate that the designated time is scheduled to perform the activity, based at least in part on an inference from at least the first communication that the first user has the intent to perform the activity.

In a first aspect of the third example system, the causation logic is configured to cause the digital personal assistant to automatically configure the visual representation of the calendar of the first user, which is configured for viewing by at least one second user that is different from the first user, to indicate that availability of the first user at the designated time is tentative.

In an example of the first aspect of the third example system, the causation logic is configured to cause the digital personal assistant to automatically configure a second visual representation of the calendar of the first user, which is configured for viewing by the first user, to indicate that the availability of the first user at the designated time is free.

In a first implementation of this example, the causation logic is configured to cause the digital personal assistant to reconfigure the second visual representation of the calendar of the first user to change an indication of the availability of the first user at the designated time in the second visual representation from free to booked in response to receipt of an acceptance of an invitation to perform the activity at the designated time from the first user and further in response to the digital personal assistant being caused to automatically schedule the designated time on the visual representation of the calendar to perform the activity.

In a second implementation of this example, the causation logic is configured to cause the digital personal assistant to reconfigure the visual representation of the calendar of the first user, which is for viewing by the at least one second user, to change an indication of the availability of the first user at the designated time in the visual representation from tentative to booked in response to receipt of an acceptance of an invitation to perform the activity at the designated time from the first user and further in response to the digital personal assistant being caused to automatically schedule the designated time on the visual representation of the calendar to perform the activity.

In a second aspect of the third example system, the causation logic is configured to cause the digital personal assistant to automatically configure the visual representation of the calendar of the first user, which is configured for viewing by the first user and not for viewing by one or more second users, to indicate that availability of the first user at the designated time is tentative or booked. In accordance with the second aspect, the causation logic is configured to cause the digital personal assistant to automatically configure a second visual representation of the calendar of the first user, which is configured for viewing by the one or more second users, to indicate that the availability of the first user at the designated time is free. The second aspect of the third example system may be implemented in combination with the first aspect of the third example system, though the example embodiments are not limited in this respect.

In a first example of the second aspect of the third example system, the causation logic is configured to cause the digital personal assistant to reconfigure the second visual representation of the calendar of the first user to change an indication of the availability of the first user at the designated time in the second visual representation from free to booked in response to receipt of an acceptance of an invitation to perform the activity at the designated time from the first user and further in response to the digital personal assistant being caused to automatically schedule the designated time on the visual representation of the calendar to perform the activity.

In a second example of the second aspect of the third example system, the causation logic is configured to cause the digital personal assistant to reconfigure the visual representation of the calendar of the first user, which is configured for viewing by the first user and not for viewing by the one or more second users, to change an indication of the availability of the first user at the designated time in the visual representation from tentative to booked in response to receipt of an acceptance of an invitation to perform the activity at the designated time from the first user and further in response to the digital personal assistant being caused to automatically schedule the designated time on the visual representation of the calendar to perform the activity.

In a third aspect of the third example system, the analysis logic is further configured to analyze one or more communications from a second user to identify an inquiry from the second user as to whether the first person is to perform the activity. In accordance with the third aspect, the analysis logic is configured to infer that the first user has the intent to perform the activity from at least the first communication in response to identification of the inquiry. The third aspect of the third example system may be implemented in combination with the first and/or second aspect of the third example system, though the example embodiments are not limited in this respect.

In a fourth aspect of the third example system, the analysis logic is configured to infer an importance of the activity from at least one of the one or more communications. In accordance with the fourth aspect, the causation logic is configured to automatically reschedule a second activity that is represented on the calendar to accommodate the activity based at least in part on the importance of the activity that is inferred from the at least one of the one or more communications being greater than an importance of the second activity. The fourth aspect of the third example system may be implemented in combination with the first, second, and/or third aspect of the third example system, though the example embodiments are not limited in this respect.

In a fifth aspect of the third example system, the analysis logic is configured to infer an importance of the activity from at least one of the one or more communications. In accordance with the fifth aspect, the causation logic is configured to automatically reduce a duration of a second activity that is represented on the calendar to accommodate the activity based at least in part on the importance of the activity that is inferred from the at least one of the one or more communications being greater than an importance of the second activity. The fifth aspect of the third example system may be implemented in combination with the first, second, third, and/or fourth aspect of the third example system, though the example embodiments are not limited in this respect.

In a sixth aspect of the third example system, the analysis logic is configured to infer an importance of the activity from at least one of the one or more communications. In accordance with the sixth aspect, the causation logic is configured to automatically cancel a second activity to accommodate the activity based at least in part on the importance of the activity that is inferred from the at least one of the one or more communications being greater than an importance of the second activity. The sixth aspect of the third example system may be implemented in combination with the first, second, third, fourth, and/or fifth aspect of the third example system, though the example embodiments are not limited in this respect.

In a seventh aspect of the third example system, the analysis logic is configured to automatically monitor conversations between the first user and one or more other users across a plurality of types of communication channels. In accordance with the seventh aspect, the one or more communications from the first user include a plurality of communications that are from the conversations and that are received via the plurality of types of communication channels. The seventh aspect of the third example system may be implemented in combination with the first, second, third, fourth, fifth, and/or sixth aspect of the third example system, though the example embodiments are not limited in this respect.

A fourth example system to perform intent-based scheduling via a digital personal assistant comprises analysis logic configured to analyze a plurality of instances of an action that are performed by a user at a plurality of respective historical time instances to identify a trend with regard to the plurality of instances of the action. The fourth example system further comprises causation logic configured to cause the digital personal assistant to automatically schedule a designated time for the user to perform a future instance of the action in accordance with the trend by configuring a visual representation of a calendar of the user to indicate that availability of the user at the designated time is tentative or booked.

In a first aspect of the fourth example system, the fourth example system further comprises determination logic configured to determine an amount of travel time that the user is statistically likely to experience during travel to a location at which the future instance of the action is to be performed. In accordance with the first aspect, the causation logic is configured to cause the digital personal assistant to configure the visual representation of the calendar of the user to indicate the amount of travel time.

In a second aspect of the fourth example system, the fourth example system further comprises inference logic configured to infer an importance of the future instance of the action. In accordance with the second aspect, the causation logic is configured to cause the digital personal assistant to at least one of automatically reschedule or automatically propose to reschedule a previously scheduled activity to accommodate the future instance of the action based at least in part on an inference that the importance of the future instance of the action is greater than an importance of the previously scheduled activity. The second aspect of the fourth example system may be implemented in combination with the first aspect of the fourth example system, though the example embodiments are not limited in this respect.

In an example of the second aspect of the fourth example system, the causation logic is configured to cause the digital personal assistant to automatically reschedule the previously scheduled activity to accommodate the future instance of the action. In accordance with this example, the causation logic further comprises a calendar analyzer configured to automatically analyze the calendar of the user to determine one or more times at which the user is available to participate in the previously scheduled activity. In further accordance with this example, the causation logic further comprises an inquiry provider configured to automatically provide an inquiry to one or more other users who are scheduled to participate in the previously scheduled activity. The inquiry presents at least one time from the one or more times as a possible time at which to participate in the previously scheduled activity. In further accordance with this example, the causation logic further comprises changing the time at which the previously scheduled activity is to be performed to a designated time, which is selected from the at least one time by at least one of the one or more other users, based at least in part on a response to the inquiry indicating selection of the designated time.

In a third aspect of the fourth example system, the fourth example system further comprises inference logic configured to infer an importance of the future instance of the action. In accordance with the third aspect, the causation logic is configured to automatically reduce an amount of time allocated to a previously scheduled activity to accommodate the future instance of the action based at least in part on an inference that the importance of the future instance of the action is greater than an importance of the previously scheduled activity. The third aspect of the fourth example system may be implemented in combination with the first and/or second aspect of the fourth example system, though the example embodiments are not limited in this respect.

In a fourth aspect of the fourth example system, the fourth example system further comprises inference logic configured to infer an importance of the future instance of the action. In accordance with the fourth aspect, the causation logic is configured to automatically cancel a previously scheduled activity to accommodate the future instance of the action based at least in part on an inference that the importance of the future instance of the action is greater than an importance of the previously scheduled activity. The fourth aspect of the fourth example system may be implemented in combination with the first, second, and/or third aspect of the fourth example system, though the example embodiments are not limited in this respect.

In a first example method of performing intent-based scheduling via a digital personal assistant, one or more communications from a first user are analyzed to identify a first communication from the first user that indicates that the first user has an intent to have a first meeting between at least the first user and one or more second users. One or more communications from the one or more second users are analyzed to identify one or more second communications from the one or more second users that are in response to the first communication and that indicate that the one or more second users have the intent to have the first meeting. The digital personal assistant is caused to at least one of automatically propose or automatically schedule a time to have the first meeting between at least the first user and the one or more second users based at least in part on the first communication and the one or more second communications indicating that the first user and the one or more second users have the intent to have the first meeting.

In a first aspect of the first example method, an importance of the first meeting is inferred. In accordance with the first aspect, causing the digital personal assistant to at least one of automatically propose or automatically schedule the time to have the first meeting comprises causing the digital personal assistant to at least one of automatically reschedule or automatically propose to reschedule a second meeting to accommodate the first meeting based at least in part on an inference that the importance of the first meeting is greater than an importance of the second meeting.

In an example of the first aspect of the first example method, causing the digital personal assistant to at least one of automatically reschedule or automatically propose to reschedule the second meeting comprises causing the digital personal assistant to automatically reschedule the second meeting to accommodate the first meeting. In accordance with this example, causing the digital personal assistant to automatically reschedule the second meeting comprises automatically analyzing at least one calendar of at least one respective second user of the one or more second users to determine one or more times at which the at least one second user is available to have the second meeting. In further accordance with this example, causing the digital personal assistant to automatically reschedule the second meeting further comprises automatically providing an inquiry to one or more specified users who are scheduled to attend the second meeting, the inquiry presenting at least one time from the one or more times as a possible time at which to conduct the second meeting. In further accordance with this example, causing the digital personal assistant to automatically reschedule the second meeting further comprises receiving a response to the inquiry that indicates selection of a designated time from the at least one time by at least one of the one or more users who are scheduled to attend the second meeting. In further accordance with this example, causing the digital personal assistant to automatically reschedule the second meeting further comprises changing the time at which the second meeting is to be conducted to the designated time based at least in part on the response to the inquiry indicating selection of the designated time.

In a second aspect of the first example method, the first example method further comprises inferring an importance of the first meeting. In accordance with the second aspect, causing the digital personal assistant to at least one of automatically propose or automatically schedule the time to have the first meeting comprises causing the digital personal assistant to automatically reduce a duration of a second meeting to accommodate the first meeting based at least in part on an inference that the importance of the first meeting is greater than an importance of the second meeting. The second aspect of the first example method may be implemented in combination with the first aspect of the first example method, though the example embodiments are not limited in this respect.

In a third aspect of the first example method, the first example method further comprises inferring an importance of the first meeting. In accordance with the third aspect, causing the digital personal assistant to at least one of automatically propose or automatically schedule the time to have the first meeting comprises causing the digital personal assistant to automatically cancel a second meeting to accommodate the first meeting based at least in part on an inference that the importance of the first meeting is greater than an importance of the second meeting. The third aspect of the first example method may be implemented in combination with the first and/or second aspect of the first example method, though the example embodiments are not limited in this respect.

In a fourth aspect of the first example method, the first example method further comprises determining a topic of the first meeting. In accordance with the fourth aspect, the first example method further comprises identifying a third user who has an attribute that corresponds to the topic. In further accordance with the fourth aspect, the first example method further comprises causing the digital personal assistant to suggest that the third user be invited to the first meeting based at least in part on the third user having the attribute that corresponds to the topic. The fourth aspect of the first example method may be implemented in combination with the first, second, and/or third aspect of the first example method, though the example embodiments are not limited in this respect.

In a fifth aspect of the first example method, the first example method further comprises inferring that a document is relevant to the first meeting. In accordance with the fifth aspect, the first example method further comprises causing the digital personal assistant to attach the document to a calendar entry that represents the first meeting based at least in part on an inference that the document is relevant to the first meeting. The fifth aspect of the first example method may be implemented in combination with the first, second, third, and/or fourth aspect of the first example method, though the example embodiments are not limited in this respect.

In a sixth aspect of the first example method, the first example method further comprises inferring a title of the first meeting from at least one of (a) at least one of the one or more communications from the first user or (b) at least one of the one or more communications from the one or more second users. The sixth aspect of the first example method may be implemented in combination with the first, second, third, fourth, and/or fifth aspect of the first example method, though the example embodiments are not limited in this respect.

In a seventh aspect of the first example method, the first example method further comprises inferring an agenda of the first meeting from at least one of (a) at least one of the one or more communications from the first user or (b) at least one of the one or more communications from the one or more second users. The seventh aspect of the first example method may be implemented in combination with the first, second, third, fourth, fifth, and/or sixth aspect of the first example method, though the example embodiments are not limited in this respect.

In an eighth aspect of the first example method, the first example method further comprises automatically generating notes from communications among at least the first user and the one or more second users that occur during the meeting. In accordance with the eighth aspect, the first example method further comprises causing the digital personal assistant to provide the notes to at least one of (a) the first user or (b) at least one second user of the one or more second users in response to automatically generating the notes. The eighth aspect of the first example method may be implemented in combination with the first, second, third, fourth, fifth, sixth, and/or seventh aspect of the first example method, though the example embodiments are not limited in this respect.

In ninth aspect of the first example method, the first example method further comprises determining that an amount of information that is to be discussed during the first meeting is not capable of being discussed within an amount of time that is allocated for the first meeting. In accordance with the ninth aspect, the first example method further comprises causing the digital personal assistant to automatically schedule a follow-up meeting for discussion of the information that is not discussed during the first meeting. The ninth aspect of the first example method may be implemented in combination with the first, second, third, fourth, fifth, sixth, seventh, and/or eighth aspect of the first example method, though the example embodiments are not limited in this respect.

In tenth aspect of the first example method, causing the digital personal assistant to at least one of automatically propose or automatically schedule the time to have the first meeting comprises causing the digital personal assistant to automatically schedule the time to have the first meeting, including causing the digital personal assistant to automatically configure a visual representation of one or more calendars of the one or more respective second users to indicate that attendance of the one or more second users at the meeting is tentative. The tenth aspect of the first example method may be implemented in combination with the first, second, third, fourth, fifth, sixth, seventh, eighth, and/or ninth aspect of the first example method, though the example embodiments are not limited in this respect.

In eleventh aspect of the first example method, the first example method further comprises automatically monitoring conversations between the first user and one or more other users across a plurality of types of communication channels. In accordance with the eleventh aspect, analyzing the one or more communications from the first user comprises analyzing the one or more communications from the first user, which include a plurality of communications that are from the conversations and that are received via the plurality of types of communication channels. The eleventh aspect of the first example method may be implemented in combination with the first, second, third, fourth, fifth, sixth, seventh, eighth, ninth, and/or tenth aspect of the first example method, though the example embodiments are not limited in this respect.

In a second example method of performing intent-based scheduling via a digital personal assistant, interactions among a plurality of users are identified. Tools that are used to facilitate the interactions are identified. An intent to have a meeting between the plurality of users is inferred. A designated tool is automatically selected from the tools to establish communication for the meeting based at least in part on the designated tool being used more than other tools to facilitate the interactions. The digital personal assistant is caused to at least one of automatically schedule the meeting or automatically propose to schedule the meeting based at least in part on an inference of the intent to have the meeting.

In a first aspect of the second example method, inferring the intent comprises inferring the intent to have the meeting from a plurality of communications among at least some of the plurality of users.

In a second aspect of the second example method, the second example method further comprises determining a topic of the meeting. In accordance with the second aspect, the second example method further comprises determining that at least one attribute of a designated user that is included in the plurality of users corresponds to the topic. In further accordance with the second aspect, causing the digital personal assistant to at least one of automatically schedule the meeting or automatically propose to schedule the meeting comprises causing the digital personal assistant to automatically schedule the meeting, including causing the digital personal assistant to automatically specify that attendance of the designated user at the meeting is required based at least in part on the at least one attribute of the designated user corresponding to the topic. The second aspect of the second example method may be implemented in combination with the first aspect of the second example method, though the example embodiments are not limited in this respect.

In a third aspect of the second example method, the second example method further comprises determining a topic of the meeting. In accordance with the third aspect, the second example method further comprises determining that a designated user does not have at least one attribute that corresponds to the topic. The designated user is included in the plurality of users. In further accordance with the third aspect, causing the digital personal assistant to at least one of automatically schedule the meeting or automatically propose to schedule the meeting comprises causing the digital personal assistant to automatically schedule the meeting, including causing the digital personal assistant to automatically specify that attendance of the designated user at the meeting is optional based at least in part on the designated user not having at least one attribute that corresponds to the topic. The third aspect of the second example method may be implemented in combination with the first and/or second aspect of the second example method, though the example embodiments are not limited in this respect.

In a fourth aspect of the second example method, the second example method further comprises determining a topic of the meeting. In accordance with the fourth aspect, the second example method further comprises determining that a designated user does not have at least one attribute that corresponds to the topic. The designated user is included in the plurality of users. In further accordance with the fourth aspect, causing the digital personal assistant to at least one of automatically schedule the meeting or automatically propose to schedule the meeting comprises causing the digital personal assistant to automatically schedule the meeting, including causing the digital personal assistant to not invite the designated user to attend the meeting based at least in part on the designated user not having at least one attribute that corresponds to the topic. The fourth aspect of the second example method may be implemented in combination with the first, second, and/or third aspect of the second example method, though the example embodiments are not limited in this respect.

In a fifth aspect of the second example method, causing the digital personal assistant to at least one of automatically schedule the meeting or automatically propose to schedule the meeting comprises causing the digital personal assistant to automatically schedule the meeting, including causing the digital personal assistant to automatically invite at least a subset of the plurality of users to attend the meeting. In accordance with the fifth aspect, the second example method further comprises determining that one or more users in the subset decline an invitation to the meeting. In further accordance with the fifth aspect, the second example method further comprises inferring an importance of each user in the subset to attend the meeting. In further accordance with the fifth aspect, the second example method further comprises causing the digital personal assistant to automatically reschedule the meeting to include each user in the subset who has an importance that is greater than or equal to a threshold importance and to not include each user in the subset who has an importance that is less than the threshold importance in response to inferring the importance of each user in the subset, at least one of the one or more users in the subset who decline the invitation having an importance that is greater than or equal to the threshold importance. The fifth aspect of the second example method may be implemented in combination with the first, second, third, and/or fourth aspect of the second example method, though the example embodiments are not limited in this respect.

In a sixth aspect of the second example method, causing the digital personal assistant to automatically reschedule the meeting comprises causing the digital personal assistant to take into consideration a time zone of each user in the subset who has an importance that is greater than or equal to the threshold importance to establish a time at which the meeting is to occur. The sixth aspect of the second example method may be implemented in combination with the first, second, third, fourth, and/or fifth aspect of the second example method, though the example embodiments are not limited in this respect.

In a seventh aspect of the second example method, the second example method further comprises inferring an importance of the meeting to each of the plurality of users. In accordance with the seventh aspect, causing the digital personal assistant to at least one of automatically schedule the meeting or automatically propose to schedule the meeting comprises causing the digital personal assistant to invite a first subset of the plurality of users to attend the meeting based at least in part on the importance of the meeting to each user in the first subset reaching a threshold importance and to not invite a second subset of the plurality of users to attend the meeting based at least in part on the importance of the meeting to each user in the second subset not reaching the threshold importance. The seventh aspect of the second example method may be implemented in combination with the first, second, third, fourth, fifth, and/or sixth aspect of the second example method, though the example embodiments are not limited in this respect.

In an eighth aspect of the second example method, the second example method further comprises automatically monitoring conversations among the plurality of users across a plurality of types of communication channels. In accordance with the eighth aspect, identifying the interactions comprises identifying the interactions that are included in the conversations and that are received via the plurality of types of communication channels. The eighth aspect of the second example method may be implemented in combination with the first, second, third, fourth, fifth, sixth, and/or seventh aspect of the second example method, though the example embodiments are not limited in this respect.

In a third example method of performing intent-based scheduling via a digital personal assistant, one or more communications from a first user are analyzed to infer from at least a first communication of the one or more communications that the first user has an intent to perform an activity. The digital personal assistant is caused to automatically schedule a designated time on a visual representation of a calendar of the first user to perform the activity, including causing the digital personal assistant to automatically update the visual representation of the calendar to include a visual representation of the activity that is configured to indicate that the designated time is scheduled to perform the activity, based at least in part on an inference from at least the first communication that the first user has the intent to perform the activity.

In a first aspect of the third example method, causing the digital personal assistant to automatically schedule the designated time comprises causing the digital personal assistant to automatically configure the visual representation of the calendar of the first user, which is configured for viewing by at least one second user that is different from the first user, to indicate that availability of the first user at the designated time is tentative.

In an example of the first aspect of the third example method, causing the digital personal assistant to automatically schedule the designated time further comprises causing the digital personal assistant to automatically configure a second visual representation of the calendar of the first user, which is configured for viewing by the first user, to indicate that the availability of the first user at the designated time is free.

In a first implementation of this example, the third example method further comprises receiving an acceptance of an invitation to perform the activity at the designated time from the first user in response to causing the digital personal assistant to automatically schedule the designated time on the visual representation of the calendar to perform the activity. In accordance with the first implementation, the third example method further comprises causing the digital personal assistant to reconfigure the second visual representation of the calendar of the first user to change an indication of the availability of the first user at the designated time in the second visual representation from free to booked in response to receiving the acceptance of the invitation.

In a second implementation of this example, the third example method further comprises receiving an acceptance of an invitation to perform the activity at the designated time from the first user in response to causing the digital personal assistant to automatically schedule the designated time on the visual representation of the calendar to perform the activity. In accordance with the second implementation, the third example method further comprises causing the digital personal assistant to reconfigure the visual representation of the calendar of the first user, which is for viewing by the at least one second user, to change an indication of the availability of the first user at the designated time in the visual representation from tentative to booked in response to receiving the acceptance of the invitation.

In a second aspect of the third example method, causing the digital personal assistant to automatically schedule the designated time comprises causing the digital personal assistant to automatically configure the visual representation of the calendar of the first user, which is configured for viewing by the first user and not for viewing by one or more second users, to indicate that availability of the first user at the designated time is tentative or booked. In accordance with the second aspect, causing the digital personal assistant to automatically schedule the designated time further comprises causing the digital personal assistant to automatically configure a second visual representation of the calendar of the first user, which is configured for viewing by the one or more second users, to indicate that the availability of the first user at the designated time is free. The second aspect of the third example method may be implemented in combination with the first aspect of the third example method, though the example embodiments are not limited in this respect.

In a first example of the second aspect of the third example method, the third example method further comprises receiving an acceptance of an invitation to perform the activity at the designated time from the first user in response to causing the digital personal assistant to automatically schedule the designated time on the visual representation of the calendar to perform the activity. In accordance with the first example, the third example method further comprises causing the digital personal assistant to reconfigure the second visual representation of the calendar of the first user to change an indication of the availability of the first user at the designated time in the second visual representation from free to booked in response to receiving the acceptance of the invitation.

In a second example of the second aspect of the third example method, the third example method further comprises receiving an acceptance of an invitation to perform the activity at the designated time from the first user in response to causing the digital personal assistant to automatically schedule the designated time on the visual representation of the calendar to perform the activity. In accordance with the second example, the third example method further comprises causing the digital personal assistant to reconfigure the visual representation of the calendar of the first user, which is configured for viewing by the first user and not for viewing by the one or more second users, to change an indication of the availability of the first user at the designated time in the visual representation from tentative to booked in response to receiving the acceptance of the invitation.

In a third aspect of the third example method, the third example method further comprises analyzing one or more communications from a second user to identify an inquiry from the second user as to whether the first person is to perform the activity. In accordance with the third aspect, the first user having the intent to perform the activity is inferred from at least the first communication in response to the inquiry being identified. The third aspect of the third example method may be implemented in combination with the first and/or second aspect of the third example method, though the example embodiments are not limited in this respect.

In a fourth aspect of the third example method, the third example method further comprises inferring an importance of the activity from at least one of the one or more communications. In accordance with the fourth aspect, causing the digital personal assistant to automatically schedule the designated time on the visual representation of the calendar of the first user comprises automatically rescheduling a second activity that is represented on the calendar to accommodate the activity based at least in part on the importance of the activity that is inferred from the at least one of the one or more communications being greater than an importance of the second activity. The fourth aspect of the third example method may be implemented in combination with the first, second, and/or third aspect of the third example method, though the example embodiments are not limited in this respect.

In a fifth aspect of the third example method, the third example method further comprises inferring an importance of the activity from at least one of the one or more communications. In accordance with the fifth aspect, causing the digital personal assistant to automatically schedule the designated time on the visual representation of the calendar of the first user comprises automatically reducing a duration of a second activity that is represented on the calendar to accommodate the activity based at least in part on the importance of the activity that is inferred from the at least one of the one or more communications being greater than an importance of the second activity. The fifth aspect of the third example method may be implemented in combination with the first, second, third, and/or fourth aspect of the third example method, though the example embodiments are not limited in this respect.

In a sixth aspect of the third example method, the third example method further comprises inferring an importance of the activity from at least one of the one or more communications. In accordance with the sixth aspect, causing the digital personal assistant to automatically schedule the designated time on the visual representation of the calendar of the first user comprises automatically cancelling a second activity to accommodate the activity based at least in part on the importance of the activity that is inferred from the at least one of the one or more communications being greater than an importance of the second activity. The sixth aspect of the third example method may be implemented in combination with the first, second, third, fourth, and/or fifth aspect of the third example method, though the example embodiments are not limited in this respect.

In a seventh aspect of the third example method, the third example method further comprises automatically monitoring conversations between the first user and one or more other users across a plurality of types of communication channels. In accordance with the seventh aspect, analyzing the one or more communications from the first user comprises analyzing the one or more communications from the first user, which include a plurality of communications that are from the conversations and that are received via the plurality of types of communication channels. The seventh aspect of the third example method may be implemented in combination with the first, second, third, fourth, fifth, and/or sixth aspect of the third example method, though the example embodiments are not limited in this respect.

In a fourth example method of performing intent-based scheduling via a digital personal assistant, a plurality of instances of an action that are performed by a user at a plurality of respective historical time instances is analyzed to identify a trend with regard to the plurality of instances of the action. The digital personal assistant is caused to automatically schedule a designated time for the user to perform a future instance of the action in accordance with the trend, including causing the digital personal assistant to configure a visual representation of a calendar of the user to indicate that availability of the user at the designated time is tentative or booked.

In a first aspect of the fourth example method, the fourth example method further comprises determining an amount of travel time that the user is statistically likely to experience during travel to a location at which the future instance of the action is to be performed. In accordance with the first aspect, the fourth example method further comprises causing the digital personal assistant to configure the visual representation of the calendar of the user to indicate the amount of travel time.

In a second aspect of the fourth example method, the fourth example method further comprises inferring an importance of the future instance of the action. In accordance with the second aspect, causing the digital personal assistant to automatically schedule the designated time for the user to perform the future instance of the action comprises causing the digital personal assistant to at least one of automatically reschedule or automatically propose to reschedule a previously scheduled activity to accommodate the future instance of the action based at least in part on an inference that the importance of the future instance of the action is greater than an importance of the previously scheduled activity. The second aspect of the fourth example method may be implemented in combination with the first aspect of the fourth example method, though the example embodiments are not limited in this respect.

In an example of the second aspect of the fourth example method, causing the digital personal assistant to at least one of automatically reschedule or automatically propose to reschedule the previously scheduled activity comprises causing the digital personal assistant to automatically reschedule the previously scheduled activity to accommodate the future instance of the action. In accordance with the third aspect, causing the digital personal assistant to automatically reschedule the previously scheduled activity to accommodate the future instance of the action comprises automatically analyzing the calendar of the user to determine one or more times at which the user is available to participate in the previously scheduled activity. In further accordance with the third aspect, causing the digital personal assistant to automatically reschedule the previously scheduled activity to accommodate the future instance of the action further comprises automatically providing an inquiry to one or more other users who are scheduled to participate in the previously scheduled activity, the inquiry presenting at least one time from the one or more times as a possible time at which to participate in the previously scheduled activity. In further accordance with the third aspect, causing the digital personal assistant to automatically reschedule the previously scheduled activity to accommodate the future instance of the action further comprises receiving a response to the inquiry that indicates selection of a designated time from the at least one time by at least one of the one or more other users. In further accordance with the third aspect, causing the digital personal assistant to automatically reschedule the previously scheduled activity to accommodate the future instance of the action further comprises changing the time at which the previously scheduled activity is to be performed to the designated time based at least in part on the response to the inquiry indicating selection of the designated time.

In a third aspect of the fourth example method, the fourth example method further comprises inferring an importance of the future instance of the action. In accordance with the third aspect, causing the digital personal assistant to automatically schedule the designated time for the user to perform the future instance of the action comprises automatically reducing an amount of time allocated to a previously scheduled activity to accommodate the future instance of the action based at least in part on an inference that the importance of the future instance of the action is greater than an importance of the previously scheduled activity. The third aspect of the fourth example method may be implemented in combination with the first and/or second aspect of the fourth example method, though the example embodiments are not limited in this respect.

In a fourth aspect of the fourth example method, the fourth example method further comprises inferring an importance of the future instance of the action. In accordance with the fourth aspect, causing the digital personal assistant to automatically schedule the designated time for the user to perform the future instance of the action comprises automatically cancelling a previously scheduled activity to accommodate the future instance of the action based at least in part on an inference that the importance of the future instance of the action is greater than an importance of the previously scheduled activity. The fourth aspect of the fourth example method may be implemented in combination with the first, second, and/or third aspect of the fourth example method, though the example embodiments are not limited in this respect.

A first example computer program product comprises a computer-readable storage medium having instructions recorded thereon for enabling a processor-based system to perform intent-based scheduling via a digital personal assistant. The instructions comprise first instructions for enabling the processor-based system to analyze one or more communications from a first user to identify a first communication from the first user that indicates that the first user has an intent to have a first meeting between at least the first user and one or more second users. The first instructions comprise instructions for enabling the processor-based system to analyze one or more communications from the one or more second users to identify one or more second communications from the one or more second users that are in response to the first communication and that indicate that the one or more second users have the intent to have the first meeting. The instructions further comprise second instructions for enabling the processor-based system to cause the digital personal assistant to at least one of automatically propose or automatically schedule a time to have the first meeting between at least the first user and the one or more second users based at least in part on the first communication and the one or more second communications indicating that the first user and the one or more second users have the intent to have the first meeting.

A second example computer program product comprises a computer-readable storage medium having instructions recorded thereon for enabling a processor-based system to perform intent-based scheduling via a digital personal assistant. The instructions comprise first instructions for enabling the processor-based system to identify interactions among a plurality of users and to identify tools that are used to facilitate the interactions. The instructions further comprise second instructions for enabling the processor-based system to infer an intent to have a meeting between the plurality of users. The instructions further comprise third instructions for enabling the processor-based system to automatically select a designated tool from the tools to establish communication for the meeting based at least in part on the designated tool being used more than other tools to facilitate the interactions. The instructions further comprise fourth instructions for enabling the processor-based system to cause the digital personal assistant to at least one of automatically schedule the meeting or automatically propose to schedule the meeting based at least in part on an inference of the intent to have the meeting.

A third example computer program product comprises a computer-readable storage medium having instructions recorded thereon for enabling a processor-based system to perform intent-based scheduling via a digital personal assistant. The instructions comprise first instructions for enabling the processor-based system to analyze one or more communications from a first user to infer from at least a first communication of the one or more communications that the first user has an intent to perform an activity. The instructions further comprise second instructions for enabling the processor-based system to cause the digital personal assistant to automatically schedule a designated time on a visual representation of a calendar of the first user to perform the activity by automatically updating the visual representation of the calendar to include a visual representation of the activity that is configured to indicate that the designated time is scheduled to perform the activity, based at least in part on an inference from at least the first communication that the first user has the intent to perform the activity.

A fourth example computer program product comprises a computer-readable storage medium having instructions recorded thereon for enabling a processor-based system to perform intent-based scheduling via a digital personal assistant. The instructions comprise first instructions for enabling the processor-based system to analyze a plurality of instances of an action that are performed by a user at a plurality of respective historical time instances to identify a trend with regard to the plurality of instances of the action. The instructions further comprise second instructions for enabling the processor-based system to cause the digital personal assistant to automatically schedule a designated time for the user to perform a future instance of the action in accordance with the trend by configuring a visual representation of a calendar of the user to indicate that availability of the user at the designated time is tentative or booked.

IV. Example Computer System

Figure 14:
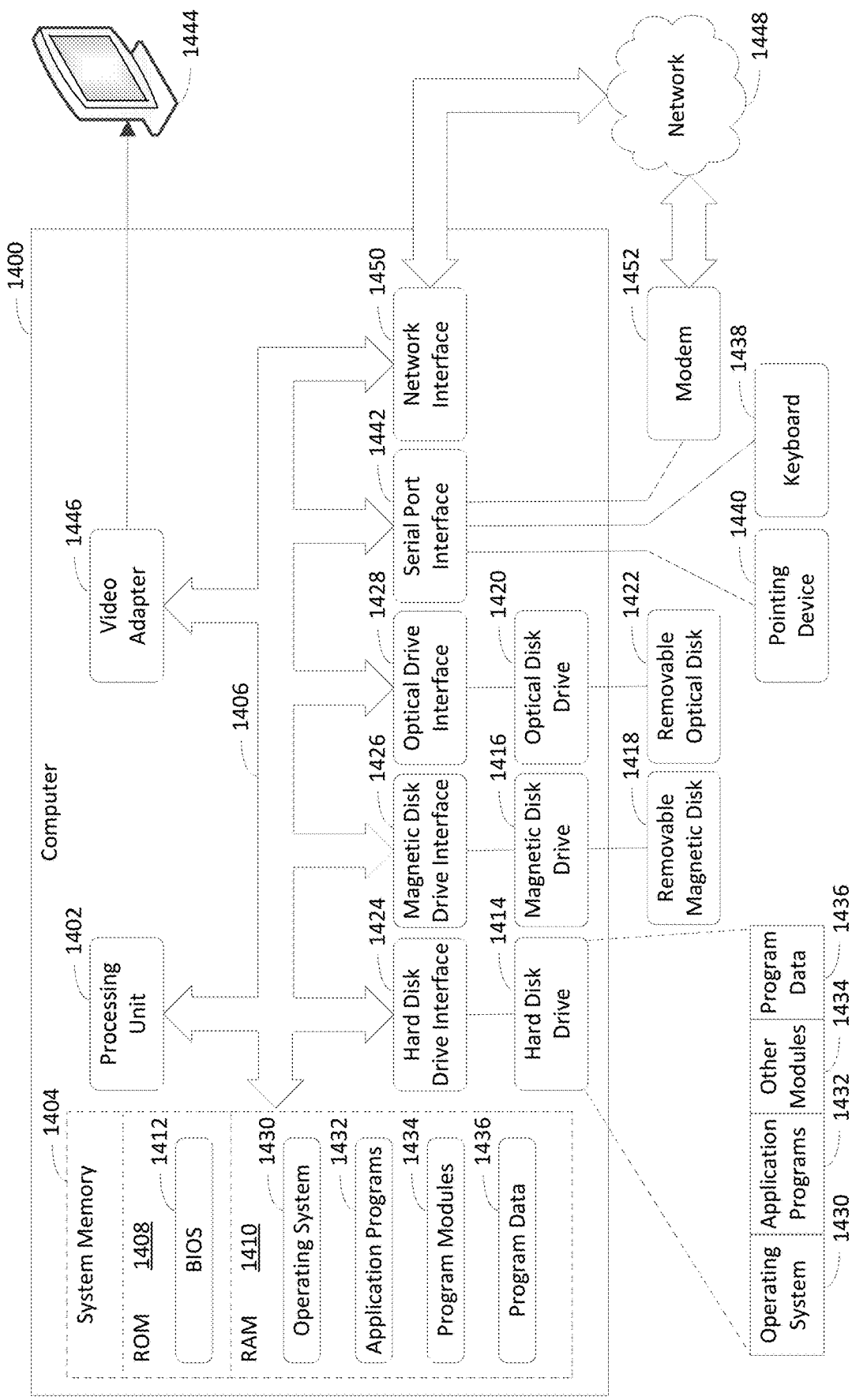
FIG. 14 depicts an example computer in which embodiments may be implemented.

FIG. 14 depicts an example computer 1400 in which embodiments may be implemented. For instance, any one or more of user devices 102A-102M and/or any one or more of servers 106A-106N shown in FIG. 1, computing system 300 shown in FIG. 3, computing system 800 shown in FIG. 8, computing system 1000 shown in FIG. 10, and/or computing system 1200 shown in FIG. 12 may be implemented using computer 1400, including one or more features of computer 1400 and/or alternative features. Computer 1400 may be a general-purpose computing device in the form of a conventional personal computer, a mobile computer, or a workstation, for example, or computer 1400 may be a special purpose computing device. The description of computer 1400 provided herein is provided for purposes of illustration, and is not intended to be limiting. Embodiments may be implemented in further types of computer systems, as would be known to persons skilled in the relevant art(s).

As shown in FIG. 14, computer 1400 includes a processing unit 1402, a system memory 1404, and a bus 1406 that couples various system components including system memory 1404 to processing unit 1402. Bus 1406 represents one or more of any of several types of bus structures, including a memory bus or memory controller, a peripheral bus, an accelerated graphics port, and a processor or local bus using any of a variety of bus architectures. System memory 1404 includes read only memory (ROM) 1408 and random access memory (RAM) 1410. A basic input/output system 1412 (BIOS) is stored in ROM 1408.

Computer 1400 also has one or more of the following drives: a hard disk drive 1414 for reading from and writing to a hard disk, a magnetic disk drive 1416 for reading from or writing to a removable magnetic disk 1418, and an optical disk drive 1420 for reading from or writing to a removable optical disk 1422 such as a CD ROM, DVD ROM, or other optical media. Hard disk drive 1414, magnetic disk drive 1416, and optical disk drive 1420 are connected to bus 1406 by a hard disk drive interface 1424, a magnetic disk drive interface 1426, and an optical drive interface 1428, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1430, one or more application programs 1432, other program modules 1434, and program data 1436. Application programs 1432 or program modules 1434 may include, for example, computer program logic for implementing any one or more of digital personal assistants 108A-108M, intent-based scheduling logic 110, intent-based scheduling logic 302, digital personal assistant 306, analysis logic 308, causation logic 310, inference logic 312, topic logic 314, identification logic 316, determination logic 318, causation logic 500, calendar analyzer 502, inquiry provider 504, time changer 506, intent-based scheduling logic 802, digital personal assistant 806, identification logic 808, causation logic 810, inference logic 812, topic logic 814, selection logic 816, determination logic 818, attribute logic 820, intent-based scheduling logic 1002, digital personal assistant 1006, analysis logic 1008, causation logic 1010, intent-based scheduling logic 1202, digital personal assistant 1206, analysis logic 1208, causation logic 1210, inference logic 1212, determination logic 1218, flowchart 200 (including any step of flowchart 200), flowchart 400 (including any step of flowchart 400), flowchart 600 (including any step of flowchart 600), flowchart 700 (including any step of flowchart 700), flowchart 900 (including any step of flowchart 900), flowchart 1100 (including any step of flowchart 1100), and/or flowchart 1300 (including any step of flowchart 1300), as described herein.

A user may enter commands and information into the computer 1400 through input devices such as keyboard 1438 and pointing device 1440. Other input devices (not shown) may include a microphone, joystick, game pad, satellite dish, scanner, touch screen, camera, accelerometer, gyroscope, or the like. These and other input devices are often connected to the processing unit 1402 through a serial port interface 1442 that is coupled to bus 1406, but may be connected by other interfaces, such as a parallel port, game port, or a universal serial bus (USB).

A display device 1444 (e.g., a monitor) is also connected to bus 1406 via an interface, such as a video adapter 1446. In addition to display device 1444, computer 1400 may include other peripheral output devices (not shown) such as speakers and printers.

Computer 1400 is connected to a network 1448 (e.g., the Internet) through a network interface or adapter 1450, a modem 1452, or other means for establishing communications over the network. Modem 1452, which may be internal or external, is connected to bus 1406 via serial port interface 1442.

As used herein, the terms "computer program medium" and "computer-readable storage medium" are used to generally refer to media (e.g., non-transitory media) such as the hard disk associated with hard disk drive 1414, removable magnetic disk 1418, removable optical disk 1422, as well as other media such as flash memory cards, digital video disks, random access memories (RAMs), read only memories (ROM), and the like. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 1432 and other program modules 1434) may be stored on the hard disk, magnetic disk, optical disk, ROM, or RAM. Such computer programs may also be received via network interface 1450 or serial port interface 1442. Such computer programs, when executed or loaded by an application, enable computer 1400 to implement features of embodiments discussed herein. Accordingly, such computer programs represent controllers of the computer 1400.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system to perform intent-based scheduling via a digital personal assistant, the system comprising:
    memory; and
    one or more processors coupled to the memory, the one or more processors configured to:
        analyze one or more communications from a first user in a conversation between the first user and one or more second users to identify a first communication from the first user that indicates that the first user has an intent to have a first meeting between at least the first user and the one or more second users;
        analyze one or more communications from the one or more second users in the conversation between the first user and the one or more second users to identify one or more second communications from the one or more second users that are in response to the first communication and that indicate that the one or more second users have the intent to have the first meeting;
        infer an importance of the first meeting based at least in part on at least one of the following:
            a frequency of interaction between the first user and at least one of the one or more second users;
            a number of interactions between the first user and at least one of the one or more second users;
            an amount of time that the first user and at least one of the one or more second users spend together;
            a number of projects that the first user has with at least one of the one or more second users;
            an amount of time at least one of (a) the first user or (b) at least one of the one or more second users devotes to subject matter that is to be discussed at the first meeting; or
            an extent of knowledge that at least one of (a) the first user or (b) at least one of the one or more second users has regarding subject matter of the first meeting; and
        cause the digital personal assistant to at least one of:
            automatically schedule a time on a first calendar of the first user and one or more second calendars of the one or more respective second users to have the first meeting between at least the first user and the one or more second users, or
            automatically propose the time such that acceptance of the time causes the digital personal assistant to automatically schedule the time on the first calendar of the first user and the one or more second calendars of the one or more respective second users to have the first meeting,
        based at least in part on an inference of the importance of the first meeting and further based at least in part on the first communication and the one or more second communications in the conversation between the first user and the one or more second users indicating that the first user and the one or more second users have the intent to have the first meeting.

2. The system of claim 1, wherein the one or more processors are configured to:
    cause the digital personal assistant to at least one of automatically reschedule or automatically propose to reschedule a second meeting to accommodate the first meeting based at least in part on an inference that the importance of the first meeting is greater than an importance of the second meeting.

3. The system of claim 2, wherein the one or more processors are configured to:
    cause the digital personal assistant to automatically reschedule the second meeting to accommodate the first meeting;
    automatically analyze at least one calendar of at least one respective second user of the one or more second users to determine one or more times at which the at least one second user is available to have the second meeting;
    automatically provide an inquiry to one or more specified users who are scheduled to attend the second meeting, the inquiry presenting at least one time from the one or more times as a possible time at which to conduct the second meeting; and
    change the time at which the second meeting is to be conducted to a designated time, which is selected from the at least one time by at least one of the one or more users who are scheduled to attend the second meeting, based at least in part on a response to the inquiry indicating selection of the designated time.

4. The system of claim 1, wherein the one or more processors are configured to:
    cause the digital personal assistant to automatically reduce a duration of a second meeting to accommodate the first meeting based at least in part on an inference that the importance of the first meeting is greater than an importance of the second meeting.

5. The system of claim 1, wherein the one or more processors are configured to:
    cause the digital personal assistant to automatically cancel a second meeting to accommodate the first meeting based at least in part on an inference that the importance of the first meeting is greater than an importance of the second meeting.

6. The system of claim 1, wherein the one or more processors are configured to:
    determine a topic of the first meeting;
    identify a third user who has an attribute that corresponds to the topic; and
    cause the digital personal assistant to suggest that the third user be invited to the first meeting based at least in part on the third user having the attribute that corresponds to the topic.

7. The system of claim 1, wherein the one or more processors are configured to:
    infer that a document is relevant to the first meeting; and
    cause the digital personal assistant to attach the document to a calendar entry that represents the first meeting based at least in part on an inference that the document is relevant to the first meeting.

8. The system of claim 1, wherein the one or more processors are configured to:
    infer a title of the first meeting, as a result of monitoring the conversation, from at least one of (a) at least one of the one or more communications from the first user in the conversation between the first user and the one or more second users or (b) at least one of the one or more communications from the one or more second users in the conversation between the first user and the one or more second users.

9. The system of claim 1, wherein the one or more processors are configured to:
    infer an agenda of the first meeting, as a result of monitoring the conversation, from at least one of (a) at least one of the one or more communications from the first user in the conversation between the first user and the one or more second users or (b) at least one of the one or more communications from the one or more second users in the conversation between the first user and the one or more second users.

10. The system of claim 1, wherein the one or more processors are configured to:
automatically generate notes from communications among at least the first user and the one or more second users that occur during the meeting; and
cause the digital personal assistant to provide the notes to at least one of (a) the first user or (b) at least one second user of the one or more second users in response to automatically generating the notes.

11. The system of claim 1, wherein the one or more processors are configured to:
determine that an amount of information that is to be discussed subsequently during the first meeting is not capable of being discussed within an amount of time that is allocated for the first meeting; and
cause the digital personal assistant to automatically schedule a follow-up meeting for discussion of the information that is not discussed during the first meeting.

12. The system of claim 1, wherein the one or more processors are configured to:
cause the digital personal assistant to automatically schedule the time to have the first meeting; and
cause the digital personal assistant to automatically configure a visual representation of the one or more second calendars of the one or more respective second users to indicate that attendance of the one or more second users at the meeting at the automatically scheduled time is tentative.

13. The system of claim 1, wherein the one or more processors are configured to automatically monitor conversations between the first user and one or more other users across a plurality of types of communication channels; and
wherein the one or more communications from the first user include a plurality of communications that are from the conversations and that are received via the plurality of types of communication channels.

14. A system to perform intent-based scheduling via a digital personal assistant, the system comprising:
memory; and
one or more processors coupled to the memory, the one or more processors configured to:
identify interactions among a plurality of users;
identify a plurality of tools that are used to facilitate the interactions, including identify one or more tools that are used to facilitate each of the interactions, based at least in part on receipt of interaction information that specifies the one or more tools that are used to facilitate each of the interactions;
generate tool information that specifies the tools that are used to facilitate the interactions in response to receipt of the interaction information;
infer an intent to have a meeting between the plurality of users;
automatically select a designated tool from the plurality of tools to establish communication for the meeting in response to receipt of the tool information based at least in part on an analysis of the tool information indicating that the designated tool is used more than other tools to facilitate the interactions among the plurality of users; and
cause the digital personal assistant to at least one of automatically schedule the meeting or automatically propose to schedule the meeting based at least in part on an inference of the intent to have the meeting.

15. The system of claim 14, wherein the one or more processors are configured to infer the intent to have the meeting from a plurality of communications among at least some of the plurality of users.

16. The system of claim 14, wherein the one or more processors are configured to:
determine a topic of the meeting;
determine that at least one attribute of a designated user that is included in the plurality of users corresponds to the topic;
cause the digital personal assistant to automatically schedule the meeting; and
cause the digital personal assistant to automatically specify that attendance of the designated user at the meeting is required based at least in part on the at least one attribute of the designated user corresponding to the topic.

17. The system of claim 14, wherein the one or more processors are configured to:
determine a topic of the meeting;
determine that a designated user does not have at least one attribute that corresponds to the topic, the designated user included in the plurality of users;
cause the digital personal assistant to automatically schedule the meeting; and
cause the digital personal assistant to automatically specify that attendance of the designated user at the meeting is optional based at least in part on the designated user not having at least one attribute that corresponds to the topic.

18. The system of claim 14, wherein the one or more processors are configured to:
determine a topic of the meeting;
determine that a designated user does not have at least one attribute that corresponds to the topic, the designated user included in the plurality of users;
cause the digital personal assistant to automatically schedule the meeting; and
cause the digital personal assistant to not invite the designated user to attend the meeting based at least in part on the designated user not having at least one attribute that corresponds to the topic.

19. The system of claim 14, wherein the one or more processors are configured to:
cause the digital personal assistant to automatically schedule the meeting;
cause the digital personal assistant to automatically invite at least a subset of the plurality of users to attend the meeting;
determine that one or more users in the subset decline an invitation to the meeting;
infer an importance of each user in the subset to attend the meeting; and
cause the digital personal assistant to automatically reschedule the meeting to include each user in the subset who has an importance that is greater than or equal to a threshold importance and to not include each user in the subset who has an importance that is less than the threshold importance in response to inferring the importance of each user in the subset, at least one of the one or more users in the subset who decline the invitation having an importance that is greater than or equal to the threshold importance.

20. The system of claim 19, wherein the one or more processors are configured to cause the digital personal assistant to take into consideration a time zone of each user in the subset who has an importance that is greater than or equal to the threshold importance to establish a time at which the meeting is to occur.

21. The system of claim 14, wherein the one or more processors are configured to:
    infer an importance of the meeting to each of the plurality of users; and
    cause the digital personal assistant to invite a first subset of the plurality of users to attend the meeting based at least in part on the importance of the meeting to each user in the first subset reaching a threshold importance and to not invite a second subset of the plurality of users to attend the meeting based at least in part on the importance of the meeting to each user in the second subset not reaching the threshold importance.

22. The system of claim 14, wherein the one or more processors are configured to automatically monitor conversations among the plurality of users across a plurality of types of communication channels; and
    wherein the conversations include the interactions, which are received via the plurality of types of communication channels.

23. A method of performing intent-based scheduling via a digital personal assistant using one or more processors of a processor-based system, the method comprising:
    analyzing one or more communications from a first user in a conversation between the first user and one or more second users, using at least one of the one or more processors, to identify a first communication from the first user that indicates that the first user has an intent to have a first meeting between at least the first user and one or more second users;
    analyzing one or more communications from the one or more second users in the conversation between the first user and the one or more second users, using at least one of the one or more processors, to identify one or more second communications from the one or more second users that are in response to the first communication and that indicate that the one or more second users have the intent to have the first meeting;
    causing the digital personal assistant to at least one of:
        automatically schedule a time on a first calendar of the first user and one or more second calendars of the one or more respective second users to have the first meeting between at least the first user and the one or more second users, or
        automatically propose the time such that acceptance of the time causes the digital personal assistant to automatically schedule the time on the first calendar of the first user and the one or more second calendars of the one or more respective second users to have the first meeting,
    based at least in part on the first communication and the one or more second communications in the conversation between the first user and the one or more second users indicating that the first user and the one or more second users have the intent to have the first meeting;
    inferring an importance of the first meeting; and
    causing the digital personal assistant to automatically reduce a duration of a second meeting to accommodate the first meeting based at least in part on an inference that the importance of the first meeting is greater than an importance of the second meeting.

* * * * *